(12) United States Patent
Hummel, Jr.

(10) Patent No.: US 9,235,316 B2
(45) Date of Patent: Jan. 12, 2016

(54) ANALYTIC PROCESS DESIGN

(71) Applicant: Accenture Global Services Limited, Dublin (IE)

(72) Inventor: David Martin Hummel, Jr., St. Charles, IL (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/337,616

(22) Filed: Jul. 22, 2014

(65) Prior Publication Data

US 2014/0337785 A1 Nov. 13, 2014

Related U.S. Application Data

(63) Continuation of application No. 12/792,457, filed on Jun. 2, 2010, now abandoned.

(51) Int. Cl.
*G06F 9/45* (2006.01)
*G06F 9/46* (2006.01)
*G06F 3/0481* (2013.01)
(Continued)

(52) U.S. Cl.
CPC ........... *G06F 3/0481* (2013.01); *G06F 8/45* (2013.01); *G06Q 10/06* (2013.01); *G06Q 10/10* (2013.01)

(58) Field of Classification Search
CPC .......... G05B 19/0426; G05B 15/02; G05B 19/41845; G06Q 10/06; G06Q 10/10; G06Q 10/0633; G06F 3/0481; G06F 8/45; G06F 8/456
See application file for complete search history.

(56) References Cited

U.S. PATENT DOCUMENTS

| | | | | |
|---|---|---|---|---|
| 7,770,008 B2* | 8/2010 | Walmsley | ............ | B41J 2/04505 380/255 |
| 7,831,827 B2* | 11/2010 | Walmsley | ............ | B41J 2/04505 380/2 |
| 7,836,426 B2 | 11/2010 | Peck | | |

(Continued)

FOREIGN PATENT DOCUMENTS

CN 101526906 A 9/2009

OTHER PUBLICATIONS

Mosser et al., From aspect-oriented requirements models to aspect-oriented business process design models: an iterative and concern-driven approach for software engineering, Mar. 2011, 12 pages.*

(Continued)

*Primary Examiner* — Thuy Dao
(74) *Attorney, Agent, or Firm* — Fish & Richardson P.C.

(57) ABSTRACT

Embodiments of the present invention are directed to a method and system for developing an analytic process. The method includes displaying, within an electronic system, a plurality of components operable to be used for designing a data analysis process. A user makes a selection of a data access component from the plurality of components. The data access component is operable for configuring access to a data source. The method further includes the user making a selection of a data selection component from the plurality of components and a data display component. The data selection component is operable for selecting data accessed via the data access component. The data display component is operable for configuring display of data based on the data selection component. Configuration data corresponding to the data access component, the data selection component, and the data display component can then be stored.

27 Claims, 18 Drawing Sheets

(51) Int. Cl.
*G06Q 10/06* (2012.01)
*G06Q 10/10* (2012.01)

(56) References Cited

U.S. PATENT DOCUMENTS

| | | | |
|---|---|---|---|
| 8,028,275 B2* | 9/2011 | Eldridge | G05B 15/02 700/86 |
| 8,056,056 B2* | 11/2011 | Eldridge | G05B 15/02 700/86 |
| 8,225,271 B2* | 7/2012 | Eldridge | G05B 15/02 717/100 |
| 8,356,282 B1 | 1/2013 | Leippe | |
| 8,392,876 B2 | 3/2013 | Austin | |
| 8,490,050 B2 | 7/2013 | Crider | |
| 8,504,979 B2 | 8/2013 | Gella | |
| 2004/0139176 A1 | 7/2004 | Farrell | |
| 2006/0117302 A1* | 6/2006 | Mercer et al. | 717/131 |
| 2008/0126987 A1* | 5/2008 | Meschian et al. | 715/825 |
| 2008/0134140 A1 | 6/2008 | Weiner | |
| 2009/0018996 A1* | 1/2009 | Hunt et al. | 707/2 |
| 2009/0113380 A1* | 4/2009 | Ploesser et al. | 717/104 |
| 2010/0058296 A1 | 3/2010 | Nattinger | |
| 2010/0083211 A1 | 4/2010 | Poole | |
| 2010/0223593 A1* | 9/2010 | Eldridge | G05B 15/02 717/105 |
| 2010/0293521 A1 | 11/2010 | Austin | |
| 2011/0185315 A1* | 7/2011 | Armour et al. | 715/853 |
| 2011/0302551 A1* | 12/2011 | Hummel, Jr. | G06Q 10/06 717/105 |
| 2013/0159964 A1 | 6/2013 | Szpak | |

OTHER PUBLICATIONS

Jablonski et al., An extended interpretation of process design and modeling, May 2009, 2 pages.*
Jakupovic et al., Application of analytic hierarchy process (AHP) to measure the complexity of the business sector and business software, May 2010, 8 pages.
Thirumaran et al., Parallel analytic hierarchy process for web service discovery and composition, Mar. 2011, 6 pages.
Eurpoean Extended Search Report dated Nov. 30, 2011, 5 pages.
Notice from the European Patent Office Dated Oct. 1, 2007 concerning business methods Amtsblatt EPA/Official Journal EP0/11/2007 pp. 592-593.
U.S. Non-Final Office Action for U.S. Appl. No. 12/792,457 dated Jul. 24, 2012, 17 pages.
U.S. Final Office Action for U.S. Appl. No. 12/792,457 dated Dec. 4, 2012, 14 pages.
U.S. Non-Final Office Action for U.S. Appl. No. 12/792,457 dated Sep. 19, 2013, 40 pages.
U.S. Final Office Action for U.S. Appl. No. 12/792,457 dated Jan. 31, 2014, 38 pages.
U.S. Notice of Allowance for U.S. Appl. No. 12/792,457 dated May 1, 2014, 8 pages.
Office Action in CA Application No. 2,739,231, dated Jul. 31, 2014, 3 pages.
Office Action in CA Application No. 2,739,231, dated May 28, 2015, 2 pages.

* cited by examiner

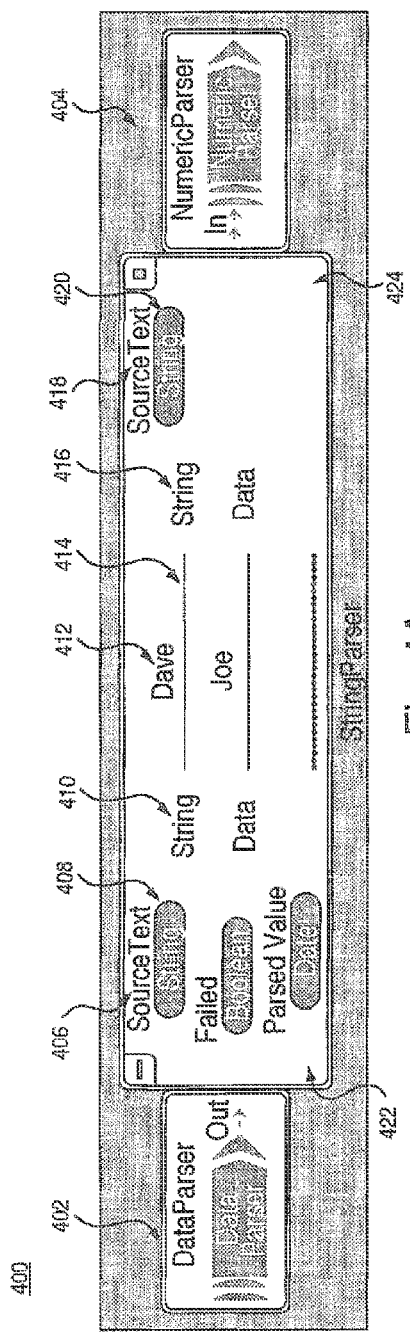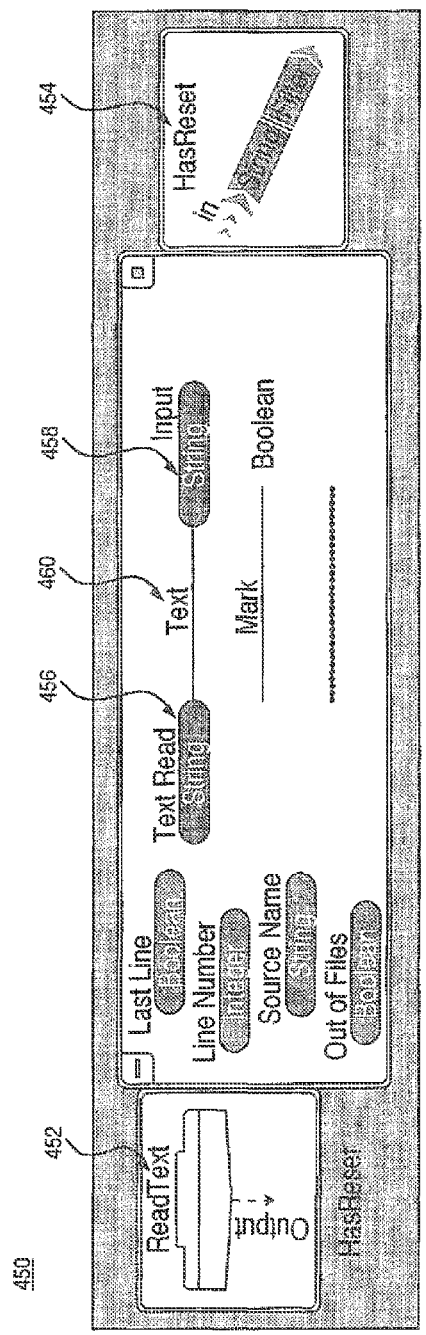
Fig. 4A
Fig. 4B

Fig. 14 Continued

ProcessLogsSaveToDG..... 1410

| Error Code | Number of E... |
|---|---|
| 101 | 8 |
| 102 | 2 |
| 103 | 3 |
| 121 | 1 |
| 131 | 2 |
| 142 | 3 |

| Error Code |
|---|
| 101 |
| 101 |
| 101 |
| 101 |
| 103 |
| 101 |
| 142 |
| 101 |
| 101 |
| 131 |

Continued from page 15 of 18

ANALYTIC PROCESS DESIGN

CROSS-REFERENCE TO RELATED APPLICATION

This application is a continuation (and claims the benefit of priority under 35 USC 120) of U.S. application Ser. No. 12/792,457, filed Jun. 2, 2010, now allowed, the entire contents of which are hereby incorporated by reference.

FIELD OF THE INVENTION

Embodiments of the present invention are generally related to digital computer systems and analytic processes.

BACKGROUND OF THE INVENTION

As computing systems have advanced, the use of computers in enterprises has increased significantly. The various parts of an enterprise each produce large amounts data in the normal course of conducting business operations. Analysis of such data may provide useful insights to improve or track business operations. Unfortunately, such data often is spread across a variety of disparate systems, such as the many different systems of an individual department. The large amounts of data and inherently different characteristics and formats of the data makes it complicated to properly analyze the data, especially in real-time scenarios.

Conventional solutions have involved developing custom analytic applications, which are individually tailored to each system. Such conventional solutions typically require many months to develop and also require a full team of dedicated developers. The development of the application, is thus, very time intensive and expensive. In addition, custom solutions often have performance and reliability issues, which limit the effectiveness of the solutions. In particular, the performance issues also can reduce the usefulness of attempts to provide real-time data. As a result, the long development periods and limited capabilities of the custom applications limit the benefits of the data analysis.

Thus, there exists a need to have more efficient development of analytics processes.

SUMMARY OF THE INVENTION

Accordingly, embodiments of the present invention provide a system and method for visually designing an analysis process. A graphical user interface (GUI) is presented for selection, layout, and configuration of components of an analytics process. The GUI allows analytic processes to be developed efficiently and configured for processing of real-time data streams.

In one embodiment, the present invention is implemented as a method for developing an analytic process. The method includes displaying, within an electronic system, a plurality of components operable to be used for designing a data analysis process. A user makes a selection of a data access component from the plurality of components. The data access component is operable for configuring access to a data source. The method further includes the user making a selection of a data selection component from the plurality of components and a data display component. The data selection component is operable for selecting data accessed via the data access component. The data display component is operable for configuring display of data based on the data selection component. Configuration data corresponding to the data access component, the data selection component, and the data display component can then be stored.

In another embodiment, the present invention is implemented as a system for analytic process development. The system includes a component library module comprising a plurality of components operable for configuring portions of the analysis process and a process design module operable used for designing an analysis process via a graphical user interface (GUI). The GUI is operable for selection of one or more components of the component library module and configuration of the one or more components. The system further includes an execution module operable for executing the analysis process based on the configuration of the one or more components and a deployment module for controlling the executing of the analysis process.

BRIEF DESCRIPTION OF THE DRAWINGS

Embodiments of the present invention are illustrated by way of example, and not by way of limitation, in the figures of the accompanying drawings and in which like reference numerals refer to similar elements.

FIGS. 4A-B show block diagrams of an exemplary variable channel mapping GUI, in accordance with one embodiment of the present invention.

DETAILED DESCRIPTION OF THE INVENTION

Figure 1:
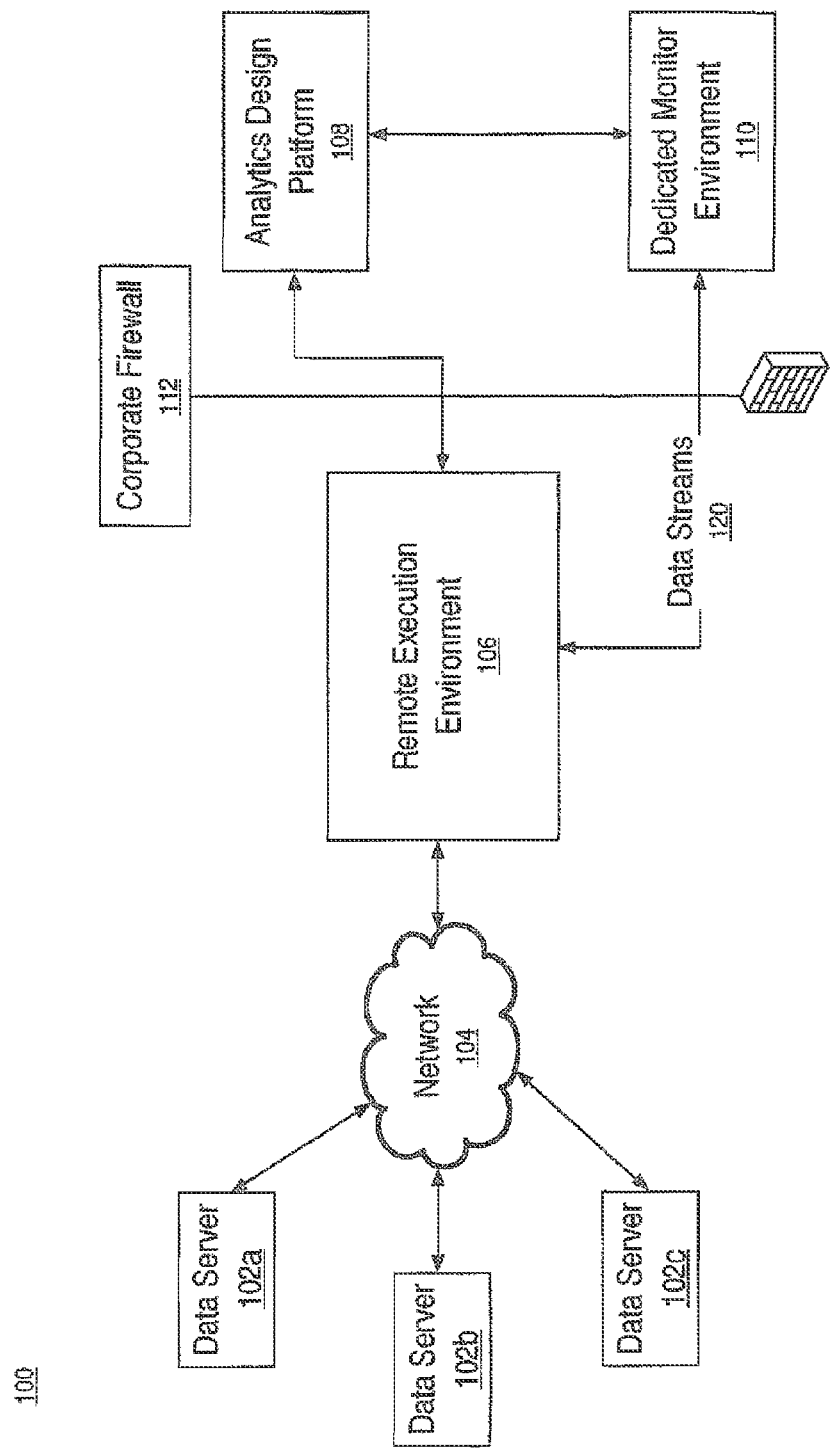
FIG. 1 shows a block diagram of an exemplary operating environment, in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment, in accordance with one embodiment of the present invention. Exemplary operating environment 100 includes data servers 102*a-c*, network 104, and remote execution environment 106, corporate firewall 112, analytics design platform 108, and dedicated monitoring environment 110. It is appreciated that components of exemplary operating environment 100 are exemplary and more or fewer components may be present in various configurations. It is appreciated that portions of operating environment 100 may be part of a distributed computing environment, a cloud computing environment, a client server environment, etc.

Remote execution environment executes analytic processes designed via analytics design platform 108. Remote execution environment 106 accesses data of data servers 102*a-c* via network 104 during execution of an analytics process. Remote execution environment 106 may include a single server or multiple servers.

In one embodiment, analytics design platform 108 is communicatively coupled to remote execution environment 106 through corporate firewall 112. Analytics design platform 106 may also control execution of analysis processes of a local execution environment (not shown) (e.g., the computing system executing analytics design platform 108). Analysis processes may also be executed on analytics design platform 106 (e.g., the local host being used for process design).

Dedicated monitor environment 110 collects and stores data of data streams 120 for analytics design platform 108. Data streams 120 include data selected by an analytics process executing on remote execution environment 106.

Analytics design platform 108 is a visually driven custom development platform that simplifies the process of data analytics. In one embodiment, a graphical user interface (GUI) is presented that is designed to be smooth, interactive, and intuitive to build data processes. Analytics design platform 108 allows drag and drop design of real-time data processes that can load data from any number of remote resources, analyze and store streams of data in real-time, and push data to display components for visualization. The visual features, among other features, of analytics design platform 108 enable non-specialists to build real-time data analysis processes. Analytics design platform 108 is further operable to access data from a large number of disparate data sources. Thus, embodiments of present invention are well suited for rapidly building data centric solutions for businesses.

For example, embodiments of the present invention can be used to design analytic processes to track, in real time, errors that occur when registering credit cards. This may number in the millions per day. Real-time reports can show how many errors occurred, what the situations were when the errors occurred, and displaying these and other data in real-time.

Embodiments of the present invention can be used in a variety of areas including, but not limited to, predictive information technology (IT) diagnostics, IT performance analytics, real-time data visualization, and business analytics.

In one embodiment, analytic design platform 108 includes an execution architecture that converts components and a designed data flow into a functional state machine and subsequently executes the state machine. The state machine is constructed to be highly multi-threaded. Embodiments of the present invention allow user selection of the number of threads or CPU cores that should be utilized in real-time.

Figure 2:
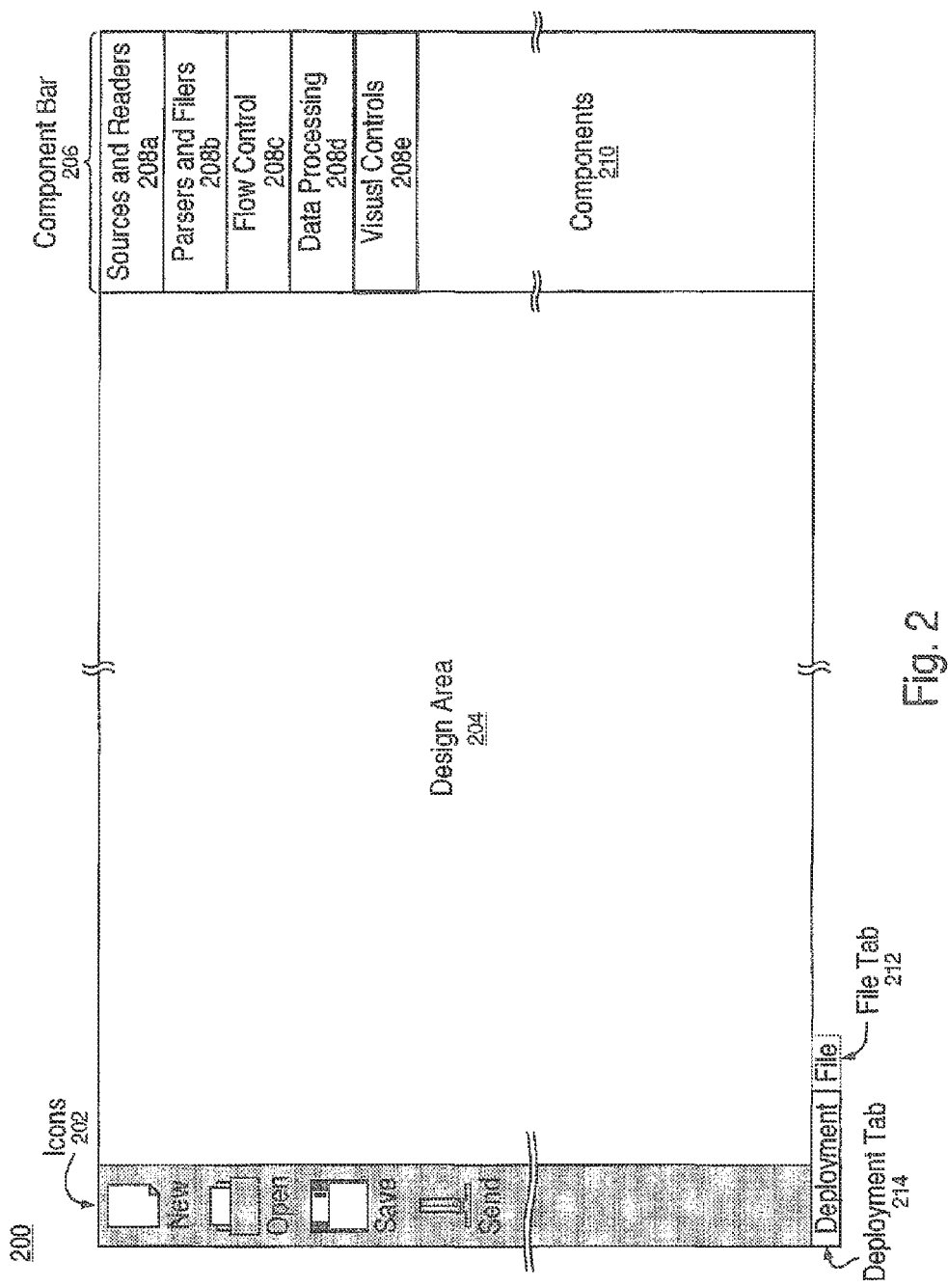
FIG. 2 shows a block diagram of an exemplary graphical user interface (GUI) for designing an analytics process, in accordance with one embodiment of the present invention.

FIG. 2 shows a block diagram of an exemplary GUI for designing an analytics process, in accordance with one embodiment of the present invention. GUI 200 includes icons 202, design area 204, component bar 206, file tab 212, and deployment tab 214. Icons 202 can include a variety of icons including, but not limited to, a new file icon, an open file icon, a save icon, and a send icon.

In one embodiment, GUI 200 is part of an integrated development environment (IDE) for rapidly developing processes which can be run on the execution architecture. A process design is saved in a file (e.g., XML) that can be broadcast over a network to a machine that is running an execution architecture which interprets the process and executes it. In one embodiment, GUI 200 utilizes state of the art native 3D acceleration to provide a smooth and graphically enriched development environment.

Component bar 206 includes components of a component library, in accordance with an embodiment of the present invention. In one embodiment, component bar comprises a plurality of categories that may include sources and readers 208a, parsers and filters 208b, flow control 208c, data processing 208d, visual controls 208e, etc. Each category comprises one or more components for developing analytics processes. Each of the components of component bar 206 has a predesigned functionality. Components can perform a variety of functions including, but not limited to, managing data flow, in depth data analysis, and controls for creating a display (e.g., a "dashboard").

Sources and readers category 208a includes data source components and data reader components. Exemplary components of the sources and readers category 208a include, but are not limited to, a FileSource component (e.g., for selecting a file which is a data source) and TextFileReader component (e.g., for reading a text file). As illustrated, visual controls category 208e is selected and includes components 210.

Parsers and filters category 208b include components that can parse and filter data streams. Exemplary components of the parsers and filters category 208b include PatternMatcher component for match selecting data matching a pattern, StringParser component for parsing out strings of data, and a RangeFilter for filtering data out of a specified range.

Flow control category 208c includes components that control the execution of the analytics process. In one embodiment, flow control category 208c includes two subcategories: triggers and controls. Exemplary components of the triggers category are SimpleTrigger for triggering on a specified condition, CounterTrigger for triggering when a count has been reached, and TerminationTrigger for stopping when a specified condition has been satisfied. Exemplary components of the controls category include the valve component (e.g., for restricting flow of data) and the PortJoin (e.g., for joining streams of data).

Data processing category 208d includes generic processing components. Exemplary components of data processing category 208d includes a SysoutComponent for processing an output of a system and a cache component for caching data.

Visual control category 208e includes graphical interface components. In one embodiment, visual control category 208e includes two subcategories: input and output. Exemplary components of the input subcategory include ButtonComponent for invoking an operation and TextSubmitComponent for submitting text (e.g., search string). Exemplary components of the output subcategory include TextDisplayComponent for displaying text.

Table 1 includes a list of exemplary components, corresponding categories, and corresponding descriptions of the components.

TABLE 1

Exemplary Components and corresponding descriptions

| Component | Category | Description |
| --- | --- | --- |
| BinaryFileReader | Readers | Reads binary files and outputs data packets from the binary files |
| TextStreamReader | Readers | Reads and parses text streams supplied by a connected source |
| HttpSource | Readers | Reads and parses text streams supplied by a connected source |
| JdbcSource | Readers | Executes queries to a database |
| PerfmonReader | Readers/ Remote Monitoring | Queries PerfMon utility on a remote Windows ™-based machine to receive real-time statistics. (Requires Win32 APIs on local and target machines) |
| RstatReader | Readers/ Remote Monitoring | Queries Rstat daemon on a remote Unix-based or Linux-based machine to receive real-time statistics. (Requires Rstatd on target machine) |
| DirectorySource | Sources | The DirectorySource component is designed to process a directory or directory structure provided by the user |
| FileSource | Sources | Selects a file or set of files |
| LiveDirectorySource | Sources | Watches a directory for streaming and/or rolling files |
| SSHSource | Sources/ Remote Monitoring | Queries SSH daemon on a remote machine. (Requires SSHd on target machine) |
| GZipConverter | Sources/ Converters | Extracts gzip data into cleartext |
| BooleanParser | Parsers | The Boolean Parser extracts text and converts it to a true/false value |
| DateParser | Parsers | The Date Parser extracts text and converts it to a date/time value |
| DurationParser | Parsers | The Duration Parser extracts text and converts it to a duration of time |
| NumericParser | Parsers | The Numeric Parser extracts text and converts it to a number |
| StringParser | Parsers | The String Parser extracts text from a larger line of text using either regular expressions or character counts |
| BlankBlockFilter | Filters | Checks the existence of a variable |

TABLE 1-continued

Exemplary Components and corresponding descriptions

| Component | Category | Description |
|---|---|---|
| BooleanFilter | Filters | The Boolean Filter component filters an incoming number based on the configured comparison types and values |
| DateFilter | Filters | The Date Filter component filters incoming dates based on the configured comparison types and values |
| DurationFilter | Filters | The Duration Filter component filters and incoming durations based on the configured comparison types and values |
| NumericFilter | Filters | The Numeric Filter component filters an incoming number based on the configured comparison types and values |
| StringFilter | Filters | The String Filter component matches the input data (source text) against the configured pattern type and pattern value |
| TextReplaceFilter | Filters | The Text Replace Filter will find particular text in a string and replace it |
| SmartFilter | Filters | Performs operations based on custom instructions. All variables used remain connected |
| CounterTrigger | Flow Controls/ Triggers | This trigger will send a set number of messages depending on its configuration. These messages contain incrementing or decrementing numbers. |
| SimpleTrigger | Flow Controls/ Triggers | This component will send a simple message as quickly as possible. It can be configured to send a fixed number of messages or to send messages continuously. |
| TerminationTrigger | Flow Controls/ Triggers | Immediately stops the process execution. |
| TimerTrigger | Flow Controls/ Triggers | This trigger sends a message-based on a configurable timer. |
| Deshuffler | Flow Controls/ Control | The Deshuffler component gathers data for an event and flushes the data to the output port when data collection is complete for the event. |
| EventRepeater | Flow Controls/ Control | This component will take an input message and repeat it a configurable number of times. |
| FileWriter | Flow Controls/ Control | The FileWriter component will write or append the input data to a file on the disk in text format or binary format. |
| PortJoiner | Flow Controls/ Control | The PortJoiner component combines data received on different input ports. |
| PortSplitter | Flow Controls/ Control | PortSplitter takes in one input message and sends it out over multiple ports. |
| Router | Flow Controls/ Control | The Router component will route data received on the input port variables on to the configured output port. |
| VariableCache | Flow Controls/ Control | VariableCache component caches and repeats different variables. |
| Accessor | Data Processing/ Collectors | Used to query Collector data |
| Collector | Data Processing/ Collectors | Organizes and stores data into memory for later retrieval |
| DatabaseCollector | Data Processing/ Collectors | Organizes and stores data into a database for later retrieval |
| KeyStoreCollector | Data Processing/ Collectors | Organizes and stores data into a non-relational data store (e.g., NoSQL) for later retrieval |
| TextOperator | Data Processing/ Manipulation | The TextOperator component provides a variety of string transformations |
| ToString | Data Processing/ Manipulation | Converts other data types to strings |
| NewlineStamper | Data Processing/ Manipulation | Adds a newline character |
| Stamper | Data Processing/ Manipulation | Stamper widget sends additional data (stamps) on the output port and passes through the data received on the input port to the output port |
| TimeStamper | Data Processing/ Manipulation | Timer Stamper widget sends an additional data (timestamp) on the output port and passes through the data received on the input port to the output port. |
| ConcurrentCounter | Data Processing/ Calculations | Determines the number of concurrent objects at any given time based on date-duration inputs |
| PeakFinder | Data Processing/ Calculations | Peak Finder widget receives input data and time from the input port and calculates the minimum and maximum value for a specific time interval and resolution |
| SessionCounter | Data Processing/ Calculations | Determines the number of concurrent sessions at any given time based on session-expiration inputs |
| DateSubtractorFilter | Data Processing/ Calculations | Subtracts the underlying numeric value of a date from another |
| SmartFilter | Data Processing/ Calculations | Perform operations based on custom instructions. All variables used remain connected |
| Cache | Data Processing/ Debug | Caches data for debugging |
| Counter | Data Processing/ Debug | Counts the number of events that pass through |
| Emailer | Data Processing/ Debug | Sends an email based on input data and allows configuration of recipient, email headers, and subject |
| Valve | Data Processing/ Debug | The Valve component is used to alternate between open and blocked flow |
| Button | Visual Controls/ Simple | A display component that shows a clickable button on the user interface for performing user actions |
| CheckBoxField | Visual Controls/ Simple | Draws a CheckBox control on the graphical user interface |
| DateField | Visual Controls/ Simple | Draws a control the on graphical user interface that accepts dates and times |
| DurationField | Visual Controls/ Simple | Draws a TextBox control on the graphical user interface that accepts duration data |
| LabelField | Visual Controls/ Simple | Draws a Label control on the graphical user interface |

TABLE 1-continued

Exemplary Components and corresponding descriptions

| Component | Category | Description |
|---|---|---|
| ListField | Visual Controls/ Simple | Draws a ListBox control on the graphical user interface |
| NumberField | Visual Controls/ Simple | Draws a TextBox control on the graphical user interface that accepts numeric data |
| TextField | Visual Controls/ Simple | Draws a TextBox control on the graphical user interface |
| TextArea | Visual Controls/ Simple | Draws a multi-line TextBox control on the graphical user interface |
| ToggleIndicator | Visual Controls/ Simple | Displays a status image based on a boolean input |
| BasicTable | Visual Controls/ Table | Displays data as a table with fixed columns and a row for each message |
| XYDisplay | Visual Controls/ Table | Displays two-dimensional data sets in a spreadsheet-like format. |
| Legend | Visual Controls/ Charting | Displays a legend for values on a related chart |
| LineChart | Visual Controls/ Charting | Displays a line chart |
| PieChart | Visual Controls/ Charting | Displays a pie chart |
| WindowCapture | Visual Controls/ Window | Captures and rasterizes an image of the GUI and exports it to a file |
| WindowSize | Visual Controls/ Window | Sets the window to a predefined size and position by default |

Processes can be a group of connected components designed to be executed on a server. Processes may communicate to other processes through specialized communication components. A process can include multiple sub processes which can be a group of connected components designed to complete a specific task. Sub processes are processes designed for reuse and are often dynamically executed from other running processes, without direct user intervention.

A component can be a purpose built class (e.g., java class), which follows standardized communication and execution rules. In one embodiment, each component is designed to complete a single step in a diagnosis effort and can potentially be connected in any way to any other component. A component can include a visual class that describes the appearance, boundaries, and port/socket locations for a component during design time. The functionality of components may be based on open source libraries.

Furthermore, components can be used to pull data from a variety of different sources. Data can be parsed into smaller pieces, and operational logic can be applied to the data based on the component configurations. Components can also store data in a database or display the data in real-time.

Each component is converted into a state (e.g., of a state machine) when a process is deployed. In one embodiment, a state is a high performance block of functional code that will be executed by the state machine within the execution architecture.

Components can further have a parameter path. The parameter path is a data structure for storing all the configuration properties of a component. A parameter path includes parameter values which are the values stored within the parameter path. A parameter editor can access the parameter path and provide a GUI for modifying the parameter path. The parameter editor can then store the modified parameter path for subsequent process deployments. In one embodiment, the parameter path can be immediately converted to XML for file storage and back again.

Components can further have ports. Transitions are connected to these ports as endpoints. In one embodiment, any output port can be connected to any input port on any component. Certain components have sockets. These socket are special end points that special components use for dedicated connections to each other.

However, components can be coupled a one way communication pathway between two components, defined herein as a "transition." A transition is customized by the end user to carry specific information.

Components can also be coupled by a connection. The connection is a standardized two-way communication pathway used between certain components specifically designed to work in tandem.

Each transition or connection includes a variable channel through which packets of data may travel within any transition or connection. The end user can connect variable channels using a variable mapping screen by double clicking any transition. Each component can have an address. The address acts as a numeric representation of a named variable channel. In one embodiment, each variable can be assigned a name by the end user and will have an associated type automatically identified by the process designer.

Each component can be customized further via the parameter editor. During the building of a process, when a component is double clicked, the developer is presented with the parameter editor in the form of a user friendly GUI. In one embodiment, the configuration of a component is visual and provides real-time validation feedback.

Design area 204 is used to design an analytics process by means of laying out selected components and connecting these components. GUI 200 thus allows development to be a completely visual process. Components can be dragged and dropped (e.g., from the component bar) and then connected together in design area 204. Connections can be double clicked to access the data (e.g., the variable representing the data) flowing between two or more components. Design area 204 performs validation during the connection and configuration of components in real-time. Design area 204 can also provide visual cues to show process design flaws (e.g., variable type mismatches).

Embodiments of the present invention allow a developer to develop custom components. For example, code (e.g., java code) can be easily wrapped in a component and thereby used in any existing data flow.

Figure 3:
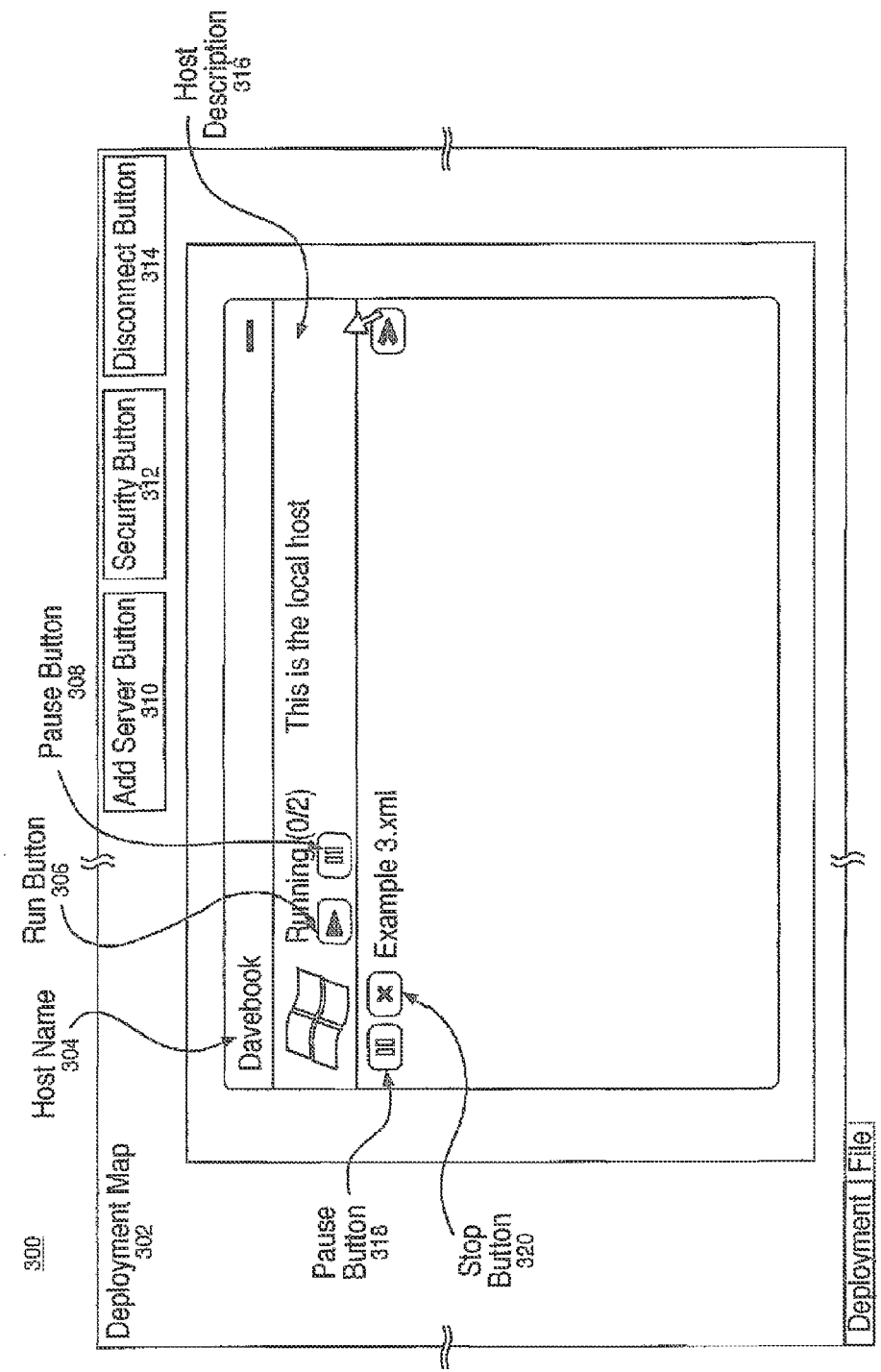
FIG. 3 shows a block diagram of an exemplary deployment GUI, in accordance with one embodiment of the present invention.

FIG. 3 shows a block diagram of an exemplary deployment GUI, in accordance with one embodiment of the present invention. Deployment GUI 300 includes deployment map 302, host name 304, run button 306, pause button 308, add server button 310, security button 312, disconnect button 314, host description 316, pause button 318, and stop button 320. Deployment map 302 allows control of analytic processes. Host name 304 corresponds to the currently selected server. Host description 316 provides information of the currently selected server. Servers may be added and selected via add server button 310. Security button 312 allows access to security settings. Disconnect button 314 allows disconnections from one or more servers.

Run button 306 executes analytics processes on the host (e.g., server) corresponding to host name 304 and any other servers involved in executing the processes. Pause button 308 pauses or suspends analytic processes on a host or plurality of hosts.

Deployment GUI 300 allows an administrator to manage an analytics process in an enterprise environment where there may be multiple servers running analytics processes. Local machines (e.g., laptops or desktops) can run processes to display data from the analytics process. In one embodiment, a peer-to-peer network is established between computing systems.

In one embodiment, deployment map 302 is tightly integrated into the same interface as GUI 200, and the deployment map 302 provides control over deploying processes to multiple servers in a large scale or simple deployment. Servers can be stopped/started/tuned. Network communication channels can be established.

FIGS. 4A-B show block diagrams of an exemplary variable channel mapping GUI, in accordance with one embodiment of the present invention. FIG. 4A shows a block diagram of an exemplary variable channel mapping GUI. Variable channel mapping GUI 400 includes components 402-404, output variable name 406, variable type 408, variable channel input type 410, variable channel name 412, variable channel 414, variable channel output type 416, input variable name 418, input variable type 420, component output variables 422, and component input variables 424. It is noted that component output variables are operable to be coupled to inputs of a variable channel. It is further noted that component input variables are coupled to the output of a variable channel.

Variable channel mapping GUI 400 is displayed based on a request to edit a transition (e.g., double clicking transition 712). It is noted that a transition should be edited prior to running the process. The editing of transitions ensures that the data and type output from one component can be sent to a coupled component. Variable channel mapping GUI 400 allows changing the outputs and inputs of a mapping to achieve the goals of the process.

Components 402 and 404 are coupled by a transition. Component 402 has output variables 422, each of which have a data type (e.g., variable type 408) and a variable name (e.g., output variable name 406). Component 404 has input variables 424 which have a data type (e.g., input variable type 420) and a variable name (e.g., input variable name 418).

Variable channel 414 has input data type 410 corresponding to the input data type of variable channel 414 and output data type 416. Output data type 416 corresponds to the output data type of variable channel 414. Variable channel 414 is operable to map an output variable of component 402 to an input of component 404.

FIG. 4B shows a block diagram of an exemplary GUI showing an exemplary variable channel mapping. GUI 450 includes components 452 and 454, variable 456, and variable 458. Variable channel 460 has variable 456 coupled on the input of variable channel 460. Variable channel 460 has variable 458 coupled to the output of variable channel 460. GUIs 400 and 450 allow a user to drag and drop variables onto variable channels to map the output of a component to the input of a follow-on component coupled via a transition or connection.

Figure 5A:
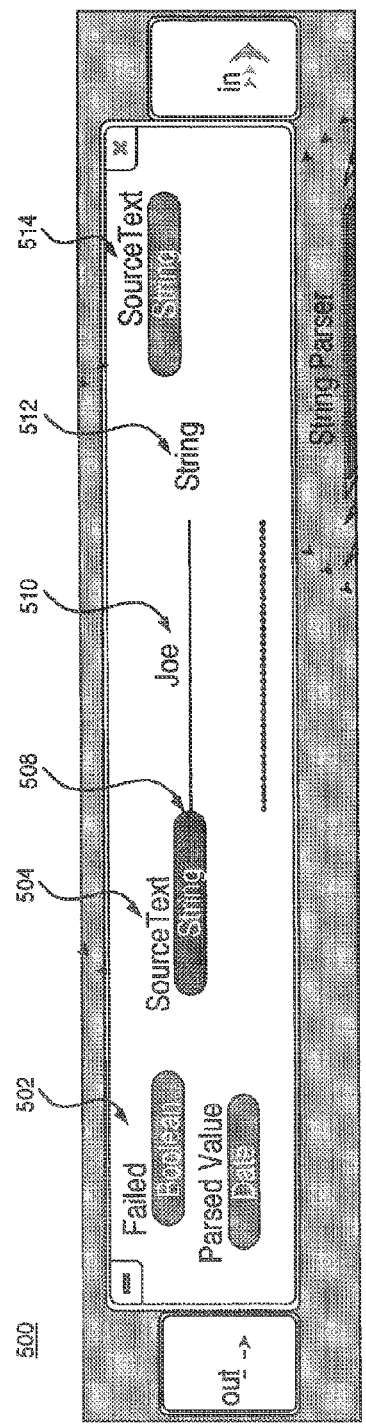
FIGS. 5A-C show block diagrams of exemplary variable channel validation indicators, in accordance with one embodiment of the present invention.
Figure 5B:
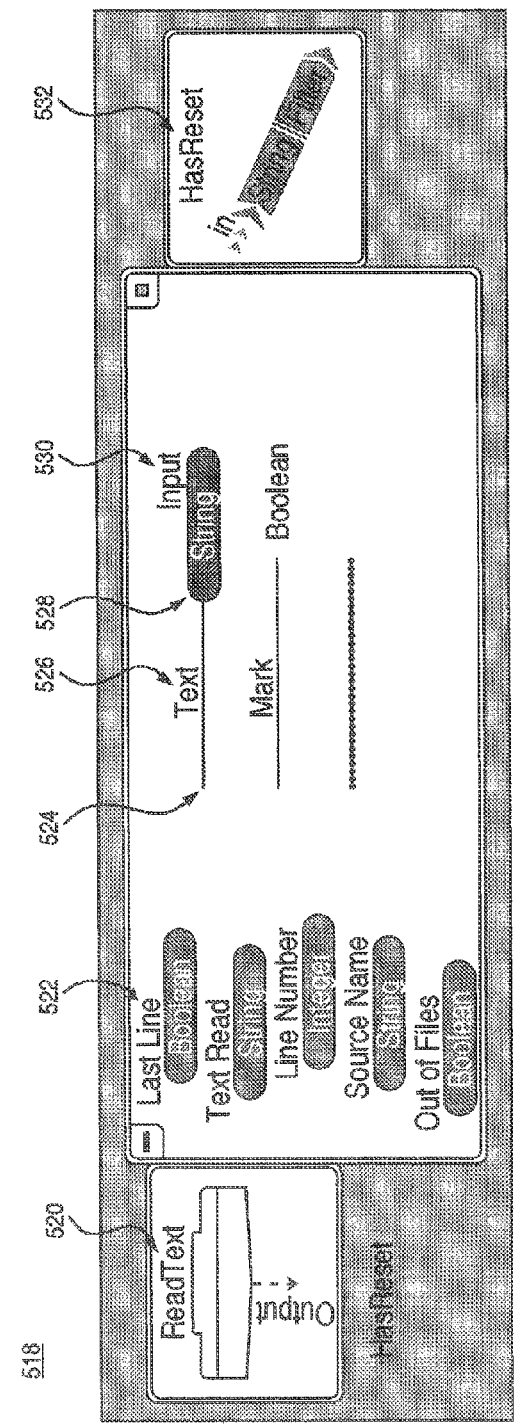
Figure 5C:
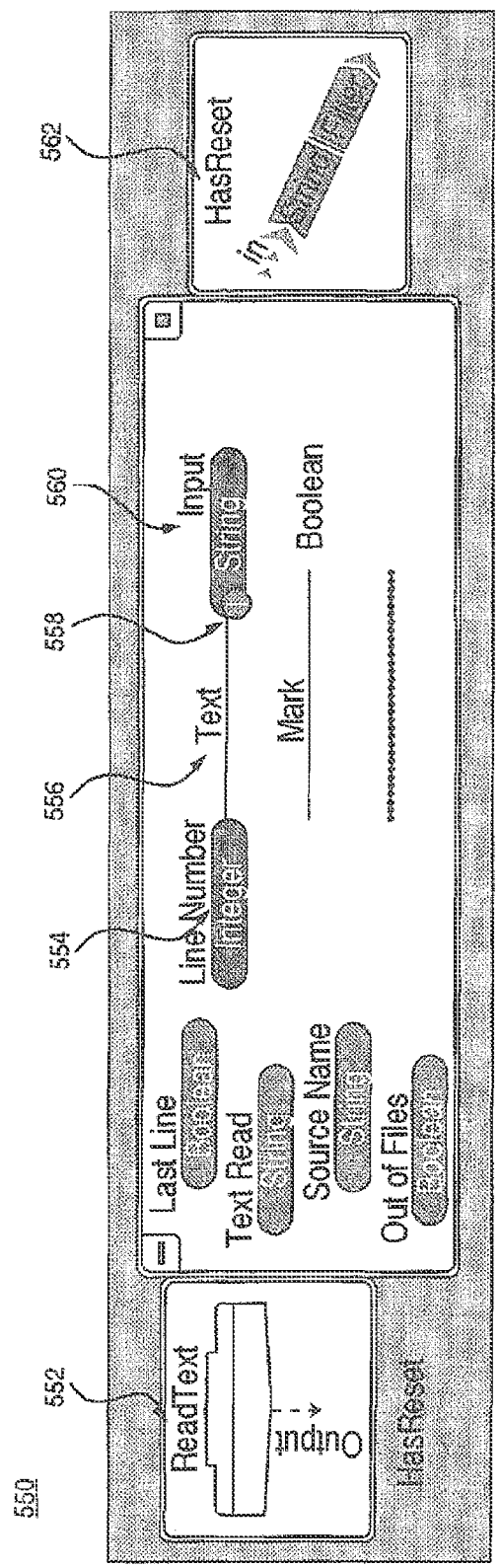

FIGS. 5A-C show block diagrams of exemplary variable channel validation indicators, in accordance with one embodiment of the present invention. FIG. 5A shows a block diagram of an exemplary GUI indicating a variable channel output validation error. GUI 500 includes output variables 502, variable 504, error indicator 508, variable channel 510, variable channel output 512, and input variable 514. Error indicator 508 indicates when a variable channel input variable (e.g., variable channel 504) is expecting to pass data to a variable channel output variable, but an output variable is not attached to the variable channel. In one embodiment, error indicator 508 is a blue question mark. A user can fix this error by assigning an output variable (e.g., input variable 514) to the variable channel (e.g., variable channel 510).

FIG. 5B shows a block diagram of an exemplary GUI indicating a variable channel input validation error. GUI 518 includes components 520 and 532, output variables 522, variable channel input 524, variable channel 526, validation error indicator 528, and input variable 530. Validation error 528 indicates that when an variable channel output variable (e.g., variable 530) is expecting data to be passed from a variable channel input (e.g., variable channel input 524) but an output variable is not attached to the variable channel (e.g., variable channel 526). In one embodiment, error indicator 528 is a yellow warning sign. A user can fix this error by assigning an output variable (e.g., one of output variables 522) to the variable channel (e.g., variable channel 526).

FIG. 5C shows a block diagram of an exemplary GUI indicating a variable channel type validation error. GUI 550 includes components 552 and 562, variable channel input variable 554, variable channel 556, error indicator 558, and variable channel output variable 560. Error indicator 558 indicates when a variable channel input variable (e.g., variable channel input 554) is connected to an incorrect variable channel output variable (e.g., variable channel output variable 560). In one embodiment, error indicator 558 is a red exclamation point. Error indicator 558 can indicate variable type miss matches. For example, an integer value cannot be passed and stored into a string variable. To fix this issue, a user can assign an input variable and output variable to the variable channel of the same type.

Figure 6A:
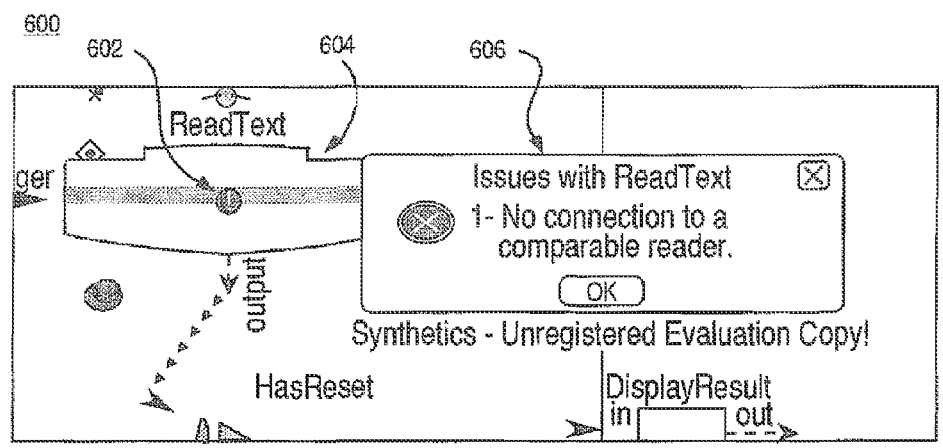
FIGS. 6A-C show block diagrams of exemplary component validation indicators, in accordance with one embodiment of the present invention.
Figure 6B:
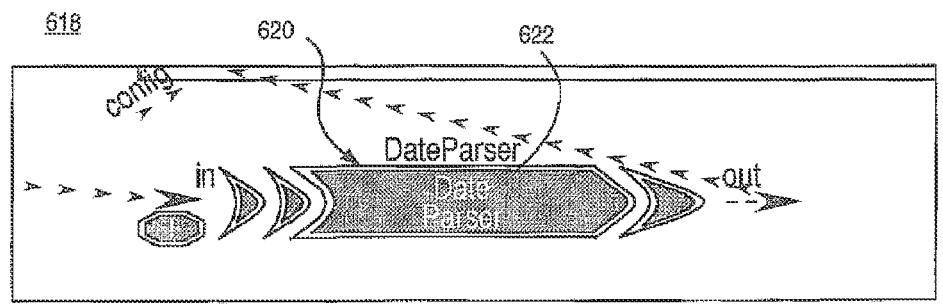
Figure 6C:
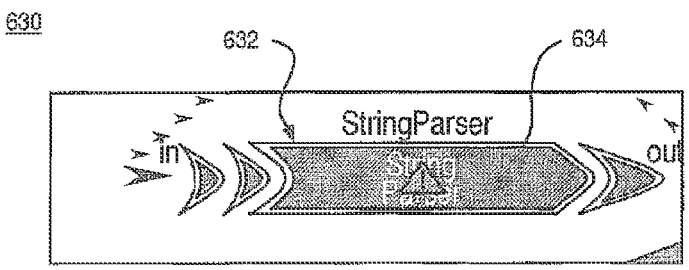

FIGS. 6A-C show block diagrams of exemplary component validation indicators, in accordance with one embodiment of the present invention. FIG. 6A shows a block diagram of an exemplary GUI indicating lack of a required connection or transition. GUI 600 includes component 604, error indicator 602, and dialogue box 606. Error indicator 602 indicates when a component requires a connection or transition, but there is not a connection or transition present. Dialogue box 606 provides a user with direction to solve the error. For example, dialogue box 606 may be presented when a user right clicks on a component. In one embodiment, error indicator 602 is a red exclamation point.

FIG. 6B shows a block diagram of an exemplary GUI indicating a variable channel output error. GUI 618 includes component 620 and error indicator 622. Error indicator 622 indicates when a component (e.g., component 620) is expecting to produce an output value, but there is no output variable attached to the variable channel. In one embodiment, error indicator 622 is a blue question mark. To solve this, a user can attach an output variable to the variable channel of the proceeding transition.

FIG. 6C shows a block diagram of an exemplary GUI indicating a variable channel input error. GUI 630 includes component 632 and error indicator 634. Error indicator 634 indicates when a component is expecting to accept an input value but no input variable is attached to the variable channel. In one embodiment, error indicator 634 is a yellow warning sign. A user can solve this by attaching an input variable to the variable channel of the preceding transition.

FIGS. 7-13 include exemplary components selected and configured for performing an exemplary analytics process for analyzing errors stored in log files. Each of the components in FIGS. 7-13 may be laid out and connected in a design area of a GUI for designing an analytics process (e.g., GUI 200). It is appreciated that such components, corresponding arrangements, and corresponding couplings are exemplary. Additional or fewer components may be present in various configurations. It is noted that components have the corresponding variable listed above the associated component.

In one embodiment, there are three stages of an analytic process deployment. The three stages are definition, construction, and execution. During the definition state, the relevant components are defined. This includes the selection of relevant components and development of any custom components, as necessary. During the construction stage, the components are arranged and coupled into a process to ensure error free data flow and processing. During the execution stage, the process definition file (e.g., XML) is loaded into the execution architecture and subsequently executed to perform data analysis.

Figure 7:
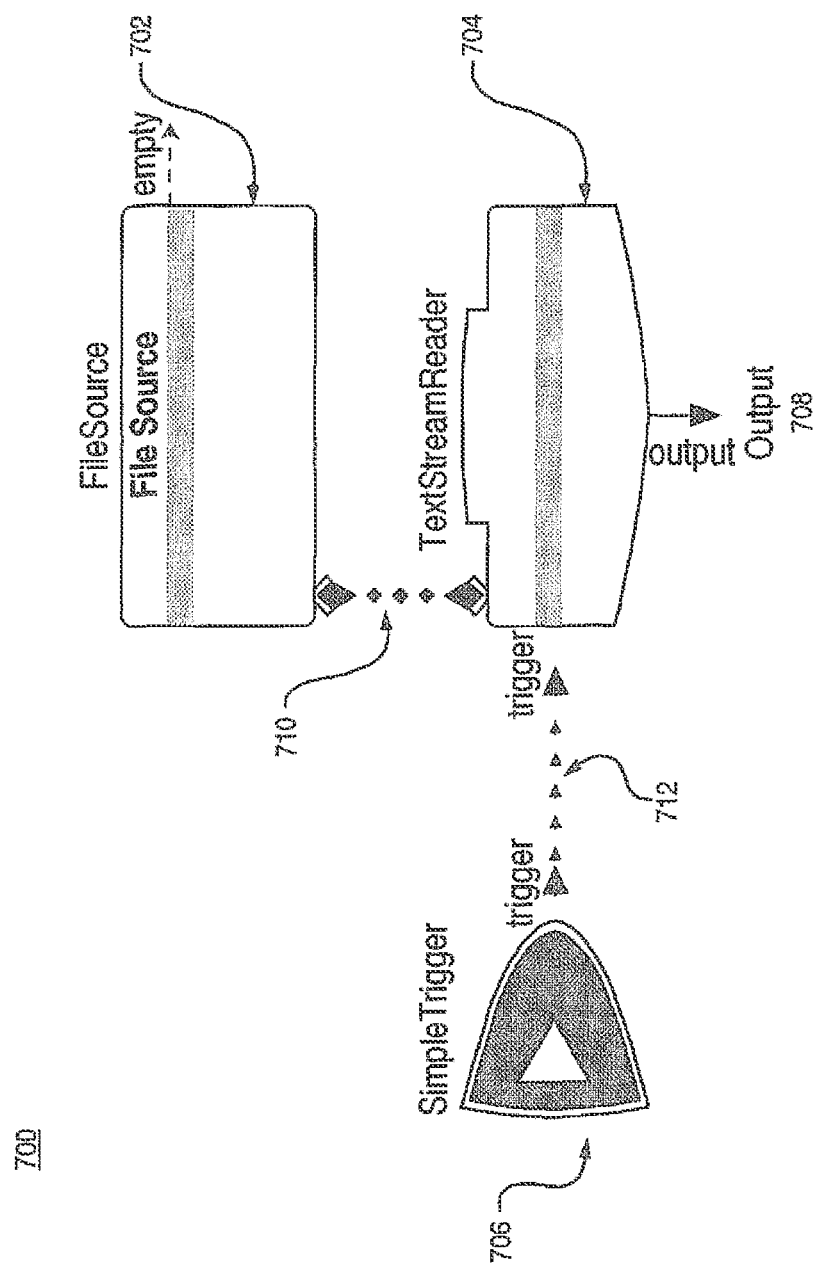
FIG. 7 shows a block diagram of exemplary components for accessing data, in accordance with an embodiment of the present invention.

FIG. 7 shows a block diagram of exemplary components for accessing data. Block diagram 700 includes connection 710, transition 712, FileSource 702, TextStreamReader 704, and SimpleTrigger 706. FileSource component 702 allows selection of one or more files, directories or subdirectories as a data source. In one embodiment, double clicking FileSource 702 displays options to configure the component via the parameter editor. FileSource 702 can be used to read from local or remote files or directories, provided there is sufficient access rights. FileSource 702 is coupled to TextStreamReader 704 (e.g., via connection 710 which can be configured to map variables). TextStreamReader 704 reads a text stream from the files and/or directories configured in FileSource 702. SimpleTrigger 706 is coupled to TextStreamReader 704. Output 708 from TextStreamReader 704 is based on the input from SimpleTrigger 706. Output 708 includes the data stream output from TextStreamReader 708.

SimpleTrigger 706 triggers TextStreamReader 704 to read the stream. In one embodiment, double clicking TextStreamReader 704 displays options for configuring TextStreamReader 704 to control how often the data stream from FileSource 702 is read. For example, setting a flag of SimpleTrigger 706 to true will send a true signal to TextStreamReader 704. This will cause TextStreamReader 704 to read data as fast as possible. As another example, a counter of SimpleTrigger 706 may be set, which records the number of times the trigger is triggered.

SimpleTrigger 706 is coupled to the incoming trigger port of TextStreamReader 704. Double clicking the transition (e.g., transition 712) between SimpleTrigger 706 and TextStreamReader 704 allows mapping of the variables of the respective output and input ports. For example, output variables of SimpleTrigger 706 can be mapped to variables of TextStreamReader 704 for reading the entire data source or reading line by line.

Figure 8:
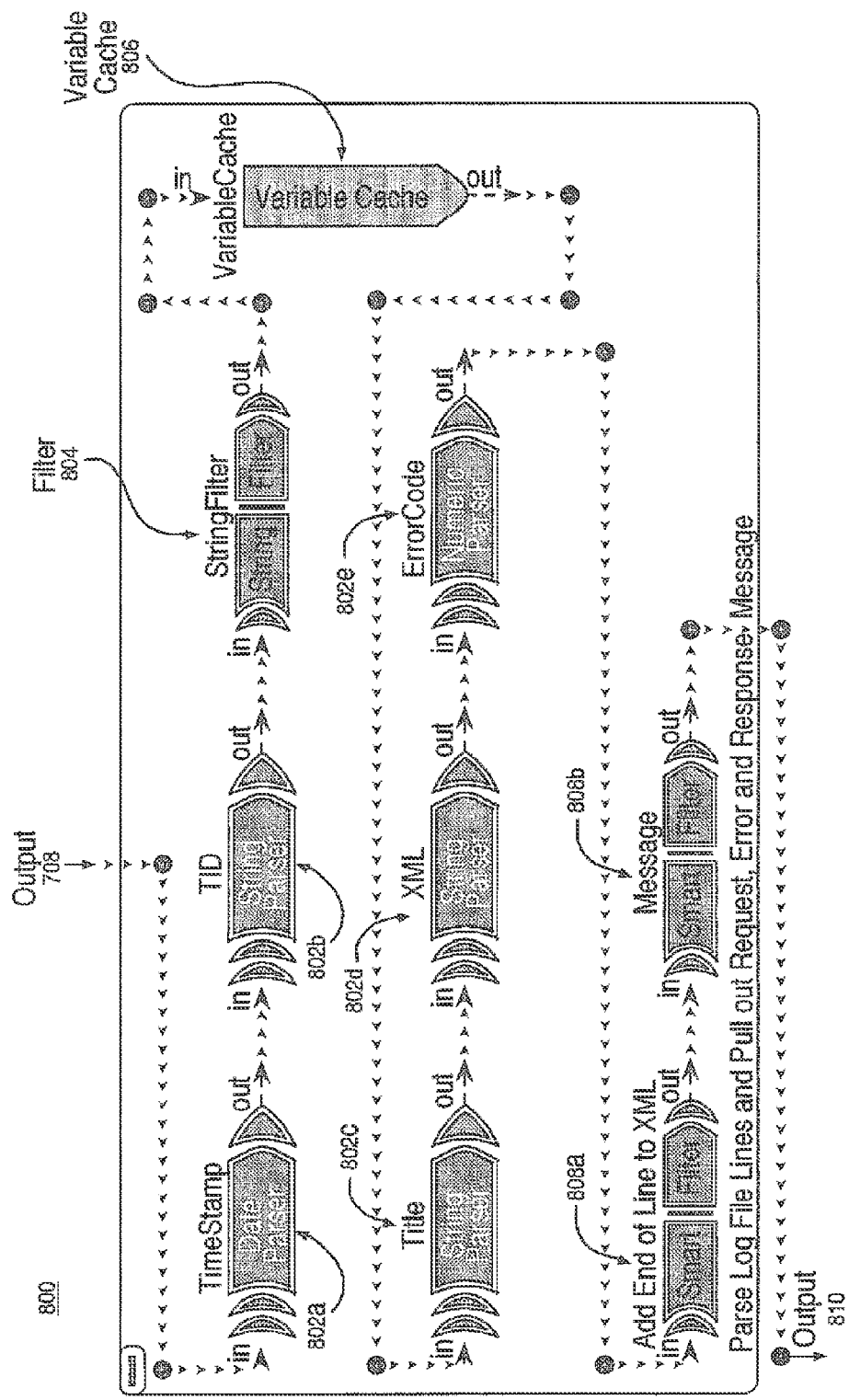
FIG. 8 shows a block diagram of exemplary components for filtering and parsing data, in accordance with an embodiment of the present invention.

FIG. 8 shows a block diagram of exemplary components for filtering and parsing data, in accordance with an embodiment of the present invention. Block diagram 800 includes parsers 802a-e, filters 804 and 808a-b, and variable cache 806. Filter 808b outputs output 810. Parsers 802a-e include date parser 802a, string parsers 802b-d, and numeric parser 802e. In one embodiment, parsers 802a-e parse data based on regular expressions.

The configuration of parsers 802a-e is performed via the parameter editor. Components (e.g., parsers 802a-e) can be configured to block portions of the data stream based on the respective operation of the component. For example, portions of a data stream can optionally be blocked based on parsing of the data stream.

Date parser 802a parses out the timestamp of the data stream received from output 708. String parser 802b parses out the thread identifier (ID) of the data stream.

Filter 804 is a string filter which performs marking of portions of the data stream based on a pattern matching (e.g., "-") the end of a log file entry. For example, some log files may have entries which span multiple lines, and thus data read from a data source line by line is marked based on the end of a log entry so that each entry of the log file can be processed.

Variable cache 806 allows reading of variables and associating the variables for further processing. For example, the thread ID and timestamp are associated such that the data stream comprises a transaction comprising each thread ID and timestamp pair. The thread ID and timestamp pair corresponds a single entry of the log file.

The data stream is then processed by string parser 802c which parses out the title of the error (e.g., based on a regular expression search of "title:"). String parser 802d parses out an XML pattern of the log entry. Numeric parser 802e pulls out error code of the data stream (e.g., based on a regular expression search of "error code:").

A smart filter is a programmable component (e.g., via a custom programming language) for performing custom and intelligent analysis. Smart filter 808a reads the XML and combines multiple lines. For example, for each non blank line, smart filter 808a appends the previous line and stores it along with a new line character.

Smart filter 808b determines when the end of an XML message of the data stream is received. Smart filter 808b indicates the end of a message via an InMessage flag (e.g., Boolean value). Smart filter 808b outputs output 810.

Figure 9:
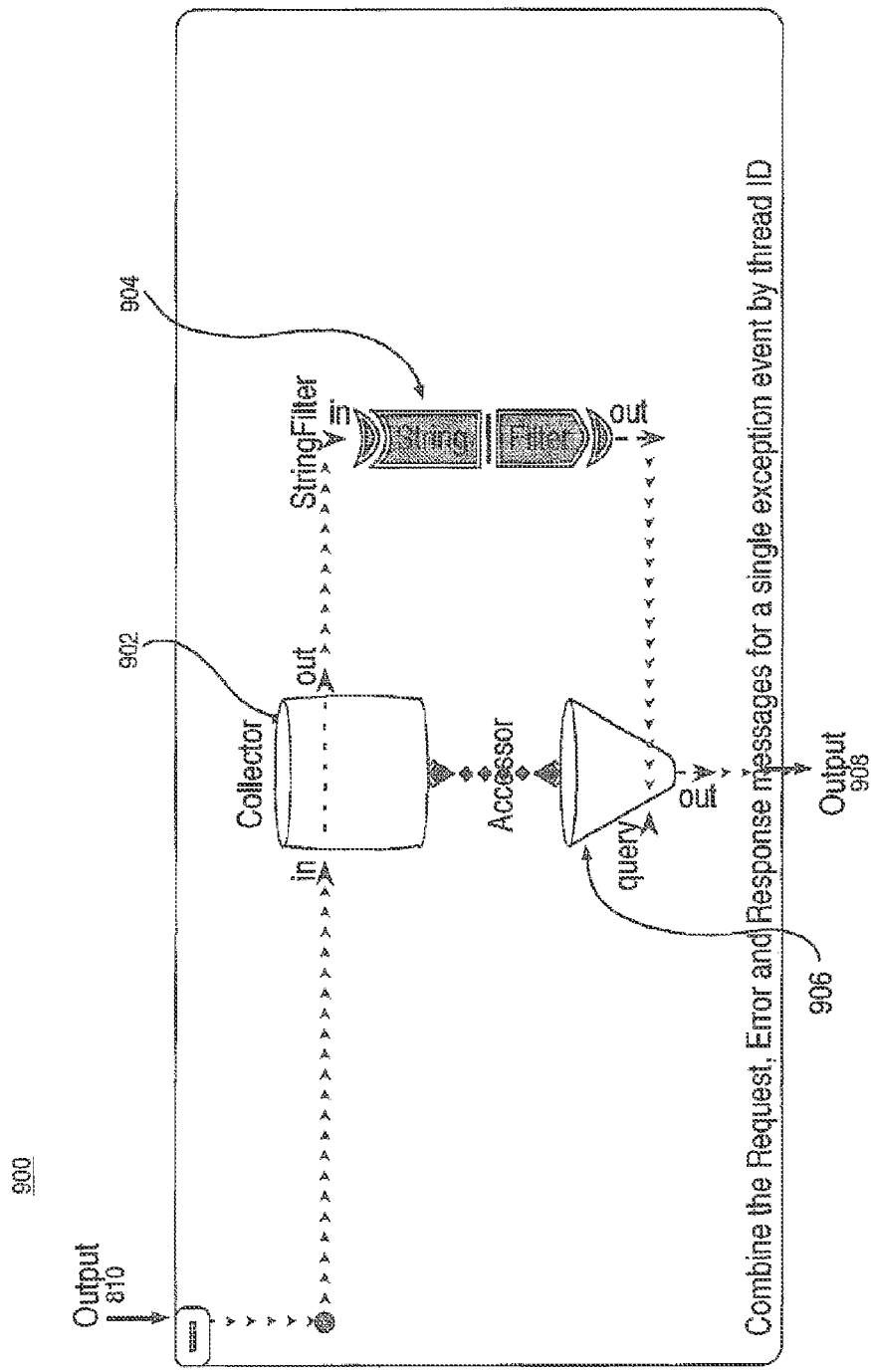
FIG. 9 shows a block diagram of exemplary components for associating data, in accordance with an embodiment of the present invention.

FIG. 9 shows a block diagram of exemplary components for associating data, in accordance with an embodiment of the present invention. Block diagram 900 includes collector component 902, string filter component 904, and accessor component 906.

A collector component can be configured in a variety of ways for storing data including indexes, entries, and lists. The index settings for a collector allow sorting and indexing of data. For example, a date index can be configured with an associated interval of five minutes. Two events (e.g., URL accesses) that occur within the same five minute interval will then be sorted and indexed together. Additional indexes can be used to further index and sort the data. For example, data can further be sorted based on the internet protocol (IP) address of computer.

Entry settings of a collector allow multiple pieces of data to be stored into a single entry of the collector. For example, if data is received including a uniform resource locator (URL) and a hit count for that URL, an entry can be stored in the collector for each URL and the sum of hits for that URL. As another example, if a response time for each URL is received, an entry can be stored in the collector for an average of each response time for the corresponding URL.

Each entry can be stored based on the index settings. For example, the average response time can be calculated for each five minute interval based on the index settings of the collector. Each entry rule (e.g., average or sum) is displayed based on the data type. For example, an average rule can be applied for a response time while an average rule may not be displayed for a string.

List settings of a collector allow storing of a list of objects. Lists can be configured to store data based on the indexes. For example, a list of a collector could contain a list of users that accessed a URL within a five minute interval. Lists can further be configured to allow or disallow repeats.

Each of the index, entry, and list settings of a collector can be assigned a name which corresponds to an input variable for the variable channel mapping GUI of the collector (e.g., GUI 400). For example, input variables based on the above examples can include date, IP, URL, hit count, response time, and user.

A list variable corresponding a list setting of a collector can correspond to multiple inputs variables. For example, a "+user" and "−user" variable can be displayed in a variable channel mapping GUI for adding user (e.g., by mapping a variable to the "+user" input variable) or removing a user (e.g., by mapping a variable to the "−user" input variable).

An accessor is used to access the data of a collector. In particular, an accessor can be used to access the data of a collector based on the configuration of the collector. In one embodiment, an accessor outputs a final row flag for indicating the last row accessed from a collector.

An accessor can be configured to access each of the indexes of a collector based on a single value or a range of values (e.g., time duration, alphabetical range). For example, a minimum and maximum time range of URL accesses can be configured for an accessor. In one embodiment, the configuration settings displayed for an accessor automatically reflect the data type of each index. For example, a minimum and maximum for a date index include dates while the configuration for a whole number index includes maximum and minimum numbers.

A database collector can be configured in a substantially similar manner to a collector and allows for storing of data into a database. A database collector can be configured with a variety of settings including, but not limited to, a database type (e.g., Oracle™, MySQL), database location (e.g., IP address), username, password, caching options, and maximum string length. An accessor can be coupled to a database collector to access data in a substantially similar manner as a collector.

Referring back to FIG. 9, collector 902 receives output 810. Collector 902 indexes and associates the parsed and filtered out values to a record. Records can then be associated to a single transaction (e.g., exception event). Each log file entry from the data stream is read and indexed via the thread ID by collector 902. Collector 902 can be configured to store the data, title, XML, message, and error code indexed by the thread ID. Collector 902 supports indexing based on one or more indexes.

To deal with a case where the thread ID is reused and to ensure that multiple entries for a single thread ID are not combined, string filter 904 is used to detect the end of a transaction or log entry. For example, string filter 904 is configured to read the QuotationResponse which indicates the end of a transaction. Upon reading the QuotationResponse, string filter 904 sends a flag (e.g., boolean flag) to accessor 906 indicating the end of a transaction.

Accessor 906 then accesses the data of collector 902 based on the flag from string filter 904 and thereby outputs combined request, error, and response messages for a single exception event based on the thread ID. Accessor 906 outputs the combined messages on output 908.

Figure 10:
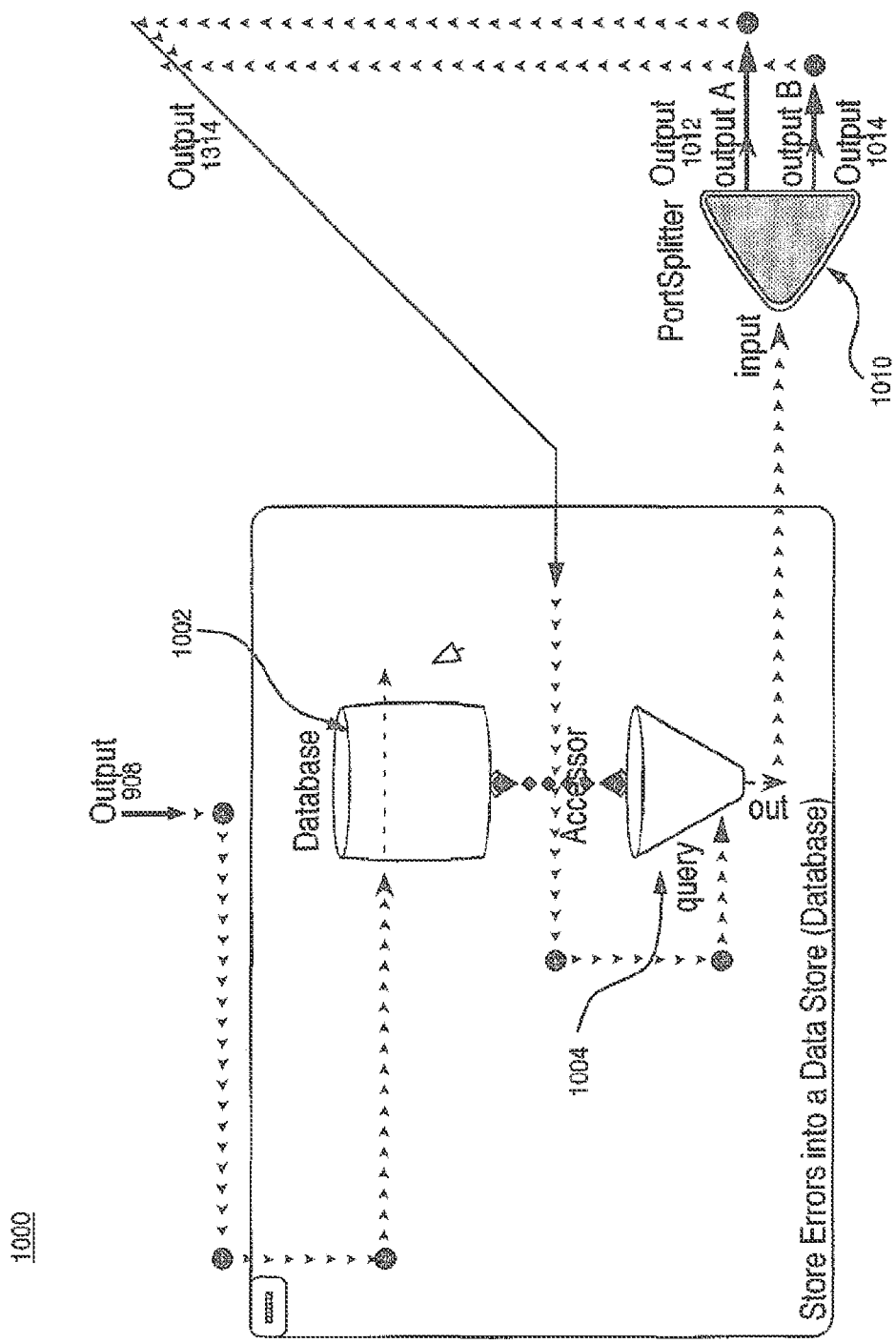
FIG. 10 shows a block diagram of exemplary components for storing data in a database, in accordance with an embodiment of the present invention.

FIG. 10 shows a block diagram of exemplary components for storing data in a database, in accordance with an embodiment of the present invention. Block diagram 1000 includes database components 1002, accessor component 1004, and port splitter component 1010.

Database component 1002 receives output 908 which is stored in database 1002. Database component 1002 can be configured via the parameter editor. In one embodiment, database component 1002 is configured to store the combined messages and index based on the thread ID. For example, database component 1002 stores the thread ID and the associated information (e.g., date, title, XML, message, and error code) into each database record. Accessor 1004 receives output 1314 and is used to access data from database 1002 based on the date range of date fields 1302-1304.

PortSplitter 1010 receives data from accessor 1004 and outputs output 1012 and output 1014. Output 1012 provides data to table 1318 and output 1014 provides data for additional processing and display by chart 1310. PortSplitter 1010 thus receives data and provides the received variables and data stream over multiple channels (e.g., outputs 1012 and 1014). PortSplitter 1010 can be configured to have any number of output ports or outputs.

Figure 11:
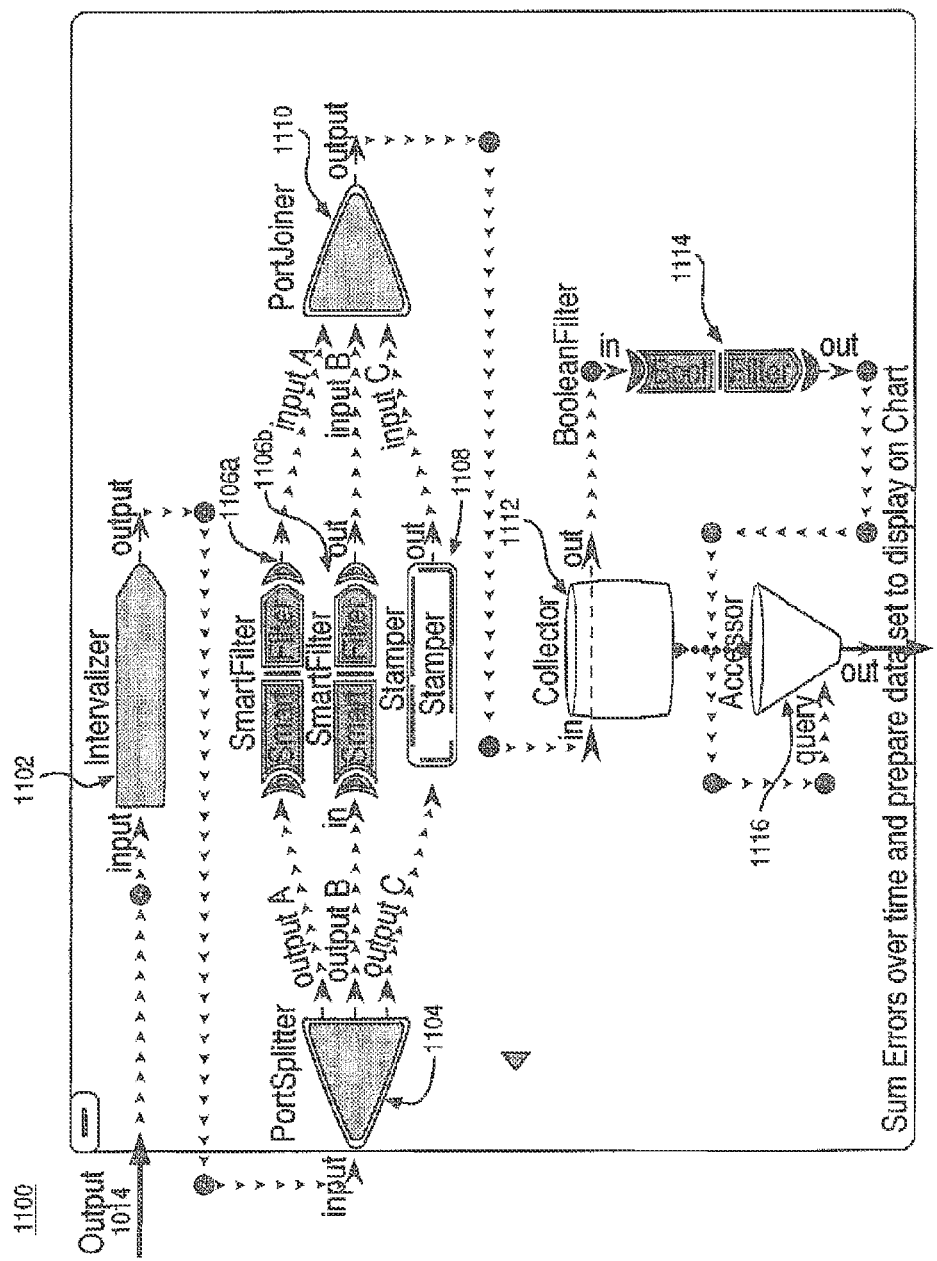
FIG. 11 shows a block diagram of exemplary components for preparing data for display, in accordance with an embodiment of the present invention.

FIG. 11 shows a block diagram of exemplary components for preparing data for display, in accordance with an embodiment of the present invention. Diagram 1100 includes Intervalizer 1102, PortSplitter 1104, filters 1106*a-b*, stamper 1108, PortJoiner 1110, collector 1112, filter 1114, and accessor 1116.

Intervalizer 1102 receives output 1014. Intervalizer 1102 allows specification of an interval for data to be grouped in, Intervalizer 1102 can be set for an interval of one minute and thus setting each timestamp of the stream to the nearest minute. For example, a timestamp of 10:00:05 will be set by intervalizer 1102 to 10:00:00. Intervalizer 1102 also supports intervals of different types including, but not limited to, dates, floats, integers, etc.

In one embodiment, PortSplitter 1104 splits or outputs the datastream into multiple copies for the data to be filtered and stamped in preparation for a graph. Smartfilters 1106*a-b* are used to set the number of errors at one minute before and one minute after an error to zero. This ensures that the lines of an output graph reflect when there are no errors. For example, smartfilter 1106*a* is programmed to set the count to zero for the date plus one minute and smartfilter 1106*b* is programmed to set the count to zero for the date minus one minute.

Stamper 1108 is used to put a stamp on each timestamp received which corresponds to an error. For example, stamper 1108 sets a count variable to one indicating that an error occurred at a specific timestamp. Stamper 1108 also outputs the last row flag indicating the last row of data has been processed and stamped.

PortJoiner 1110 mergers the data streams from Smartfilters 1106*a-b* and stamper 1108. For example, PortJoiner 1110 merges the timestamps and the counts for each timestamp upon receiving the last row flag.

The data stream is then stored into collector 1112 and indexed by the date or timestamp (e.g., indexing set via the parameter editor). The data stream is then filtered by BooleanFilter 1114 which controls when the records of collector 1112 are read. BooleanFilter 1114 reads the last row database flag of collector 1112 and blocks the data while the last row database flag is set to false. When the last row database flag is set to true, BooleanFilter 1114 signals accessor 1116 so that data will be output by accessor 1116 on output 1118. Accessor 1116 thereby outputs the number of errors that occur at each given timestamp.

Figure 12:
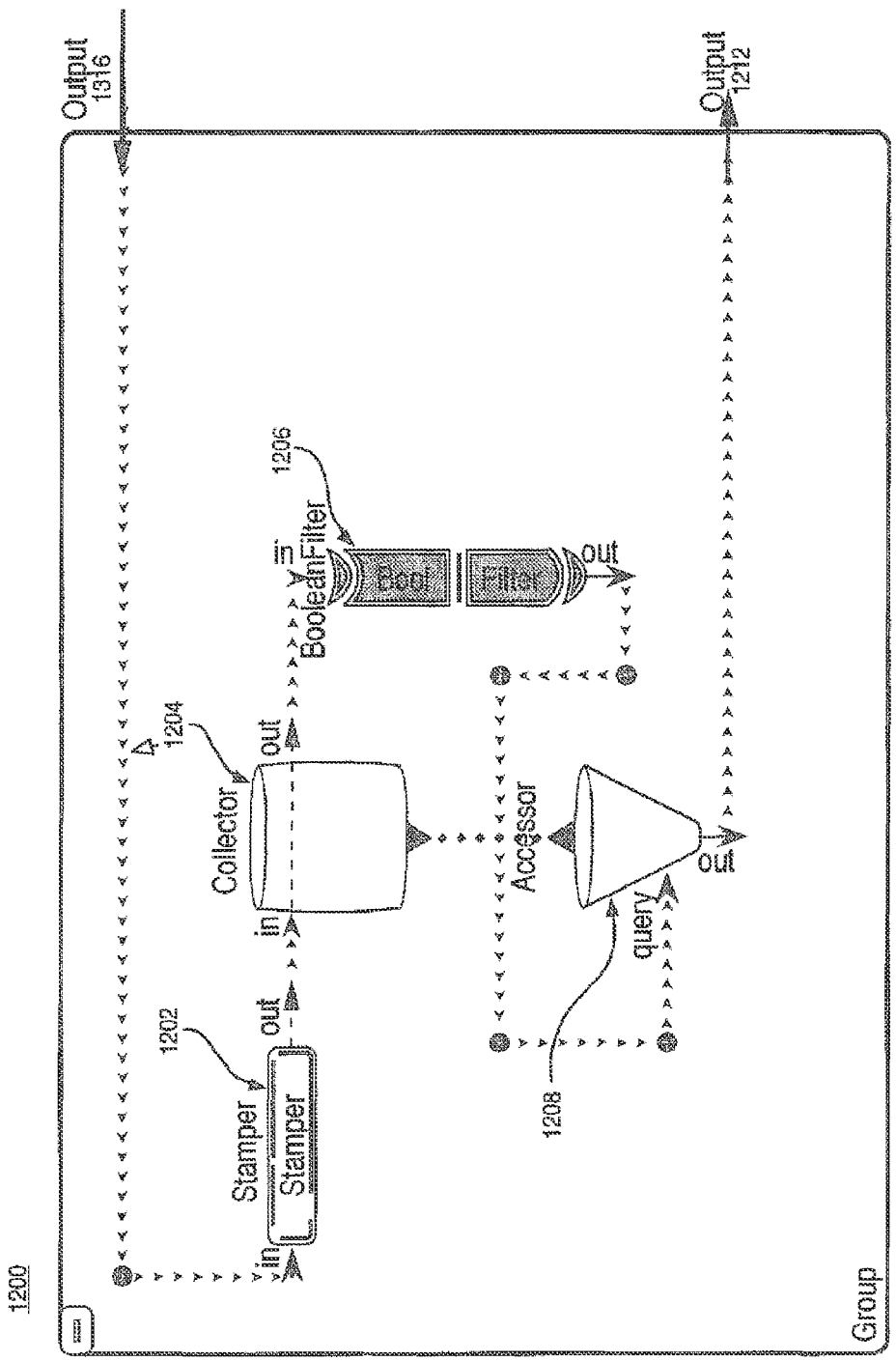
FIG. 12 shows a block diagram of exemplary components for grouping data, in accordance with an embodiment of the present invention.

FIG. 12 shows a block diagram of exemplary components for grouping data, in accordance with an embodiment of the present invention. Diagram 1200 includes Stamper 1202, collector 1204, Booleanfilter 1206, and accessor 1208.

Stamper 1202 receives output 1316 from table 1318. Stamper 1202 stamps the data stream on every error type so that the error type can be specified for indexing in collector

1204. In one embodiment, collector 1204 is configured to index based on the error code and group and sum the number of errors for each error code.

BooleanFilter 1206 is configured to read the final row flag from collector 1204. In one embodiment, BooleanFilter 1206 is configured block the output until the final row flag is true. BooleanFilter 1206 thereby activates accessor 1208 to output data via output 1212. The data includes the error code and the number of errors for each error code. This aggregation of errors by error code allows output of the number of errors per error code and thereby indicates the errors occurring most often.

Figure 13:
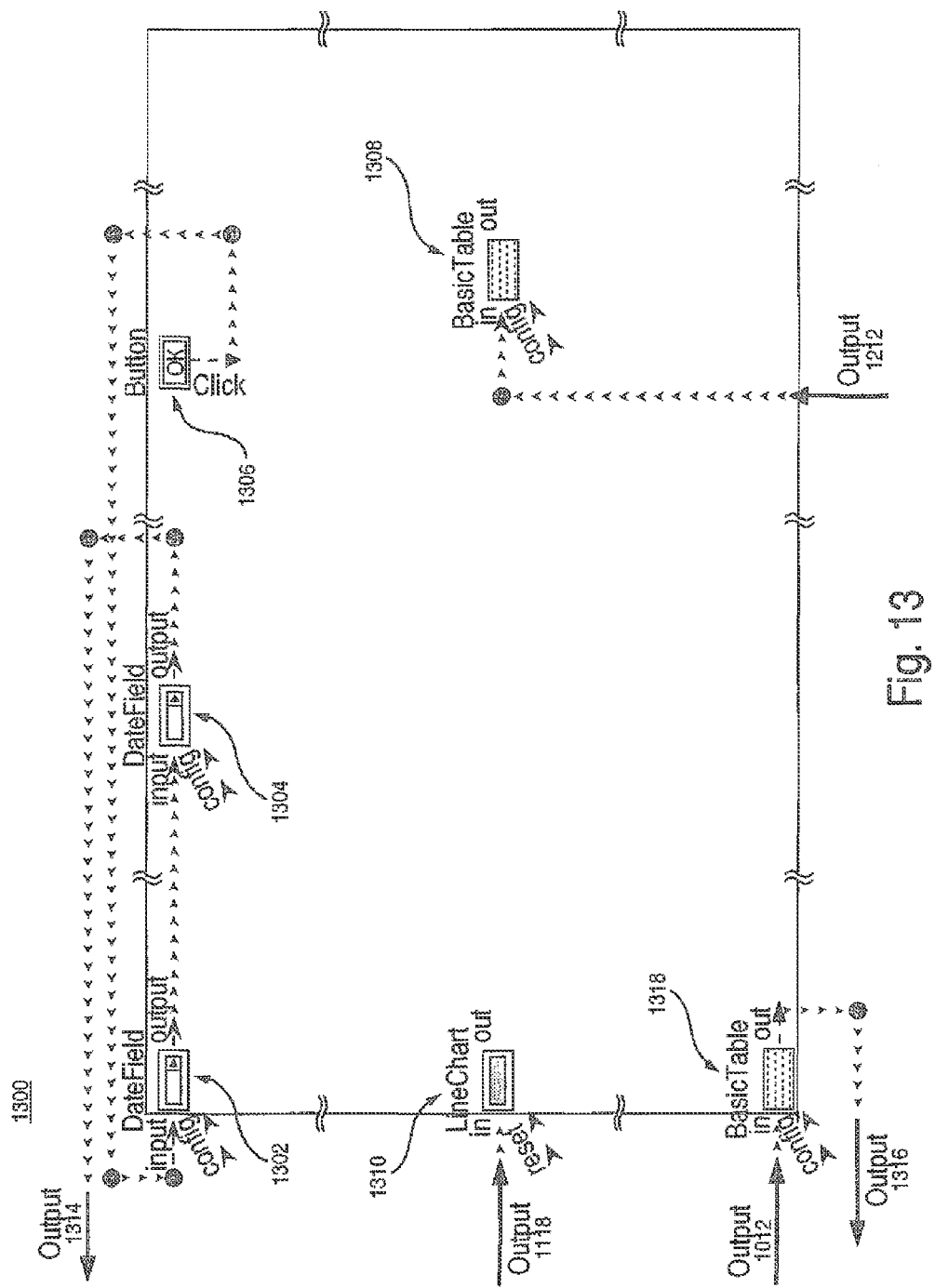
FIG. 13 shows a block diagram of exemplary components for displaying data, in accordance with an embodiment of the present invention.

FIG. 13 shows a block diagram of exemplary components for displaying data, in accordance with an embodiment of the present invention. Diagram 1300 includes date fields 1302-1304, button 1306, chart 1310, tables 1308 and 1318. Visual components of embodiments of the present invention are what you see is what you get (WYSIWYG).

Date fields 1302-1304 allow selection of a "to date" and "from date" range, respectively. The parameter editor allows configuration of the format of the date (e.g., hours, minutes, seconds, day, month, and year) and a maximum and minimum date range. The date field 1304 outputs output 1314 which is received by accessor 1004. Button 1306 is coupled to date field 1302 and upon clicking of button 1306 at runtime the range of date fields 1302-1304 is applied to the datastream. Button 1306 can be configured so that when the button is clicked a click flag is set to true and sent to date field 1302. The click flag is then passed to date field 1302, date field 1304, and then to accessor 1004.

Table 1318 is configured with columns including date, thread ID, title, and error code. Table 1318 displays the data based on date fields 1302-1304. Table 1318 receives output 1012 and outputs the data for aggregating the type of errors that occur most often (e.g., FIG. 12).

Table 1308 receives output 1212. Table 1308 is configured with an error code column and a number of errors column. Table 1308 can further be configured to have a maximum size, a refresh interval, and the formatting of the columns (e.g., decimal, dates, time intervals, etc.). Embodiments of the present invention are operable to automatically detect the format of incoming data and automatically assign the corresponding format to the table column (e.g., float format for a column of float data). Table 1308 displays the data based on date fields 1302-1304.

Chart or graph 1310 receives output 1118 which includes the number of errors for each interval. Chart 1310 can be configured based on a variety of options via the parameter editor including, but not limited to, a chart name, title (e.g., Vertex Errors), x-axis title, y-axis title, x-axis type (e.g., date, decimal, etc.), y-axis type (e.g., whole number), the format for the x-axis (e.g., data format with or without seconds) and the format of the y-axis. In one embodiment, the chart or graphing component 1310 is a java graphing component.

Figure 14:
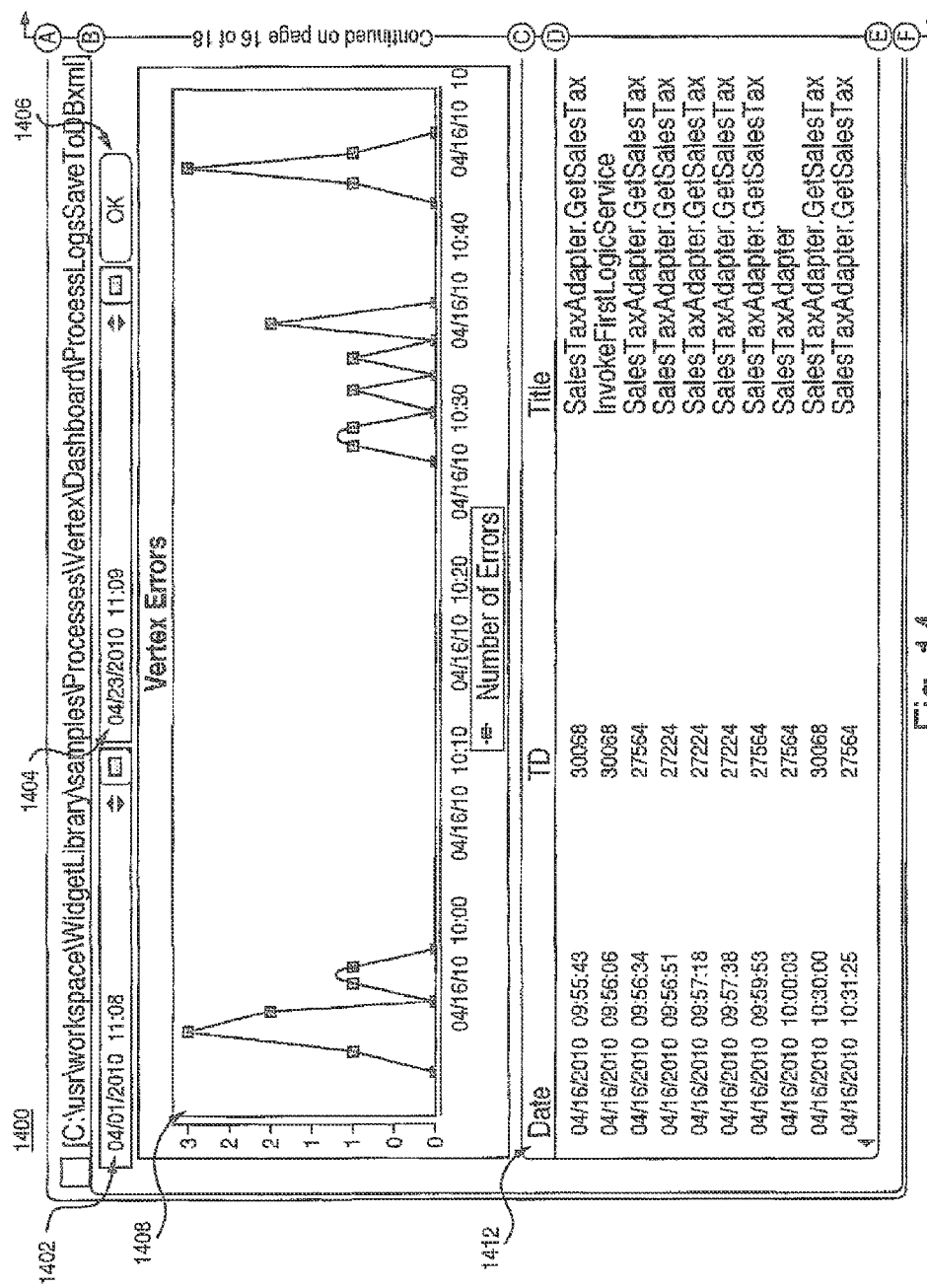
FIG. 14 shows a block diagram of an exemplary GUI for displaying data, in accordance with an embodiment of the present invention.

FIG. 14 shows a block diagram of an exemplary GUI for displaying data, in accordance with an embodiment of the present invention. GUI 1400 includes date fields 1402-1404, button 1406, graph 1408, and tables 1410-1412. GUI 1400 allows reading and writing into a data analysis process for a fully interactive end user experience.

Date fields 1402-1404 allow entry of a "to date" and a "from date," respectively. Button 1406 invokes application of the date range of date fields 1402-1004 to the analytics process.

Graph 1408 displays a graph of the data from the analytics process. For example, graph 1408 displays the number of errors for a plurality of time intervals (e.g., each minute). Table 1410 displays the number of errors for each error code. Table 1412 displays error information including date, thread ID, title, and error code.

Figure 15:
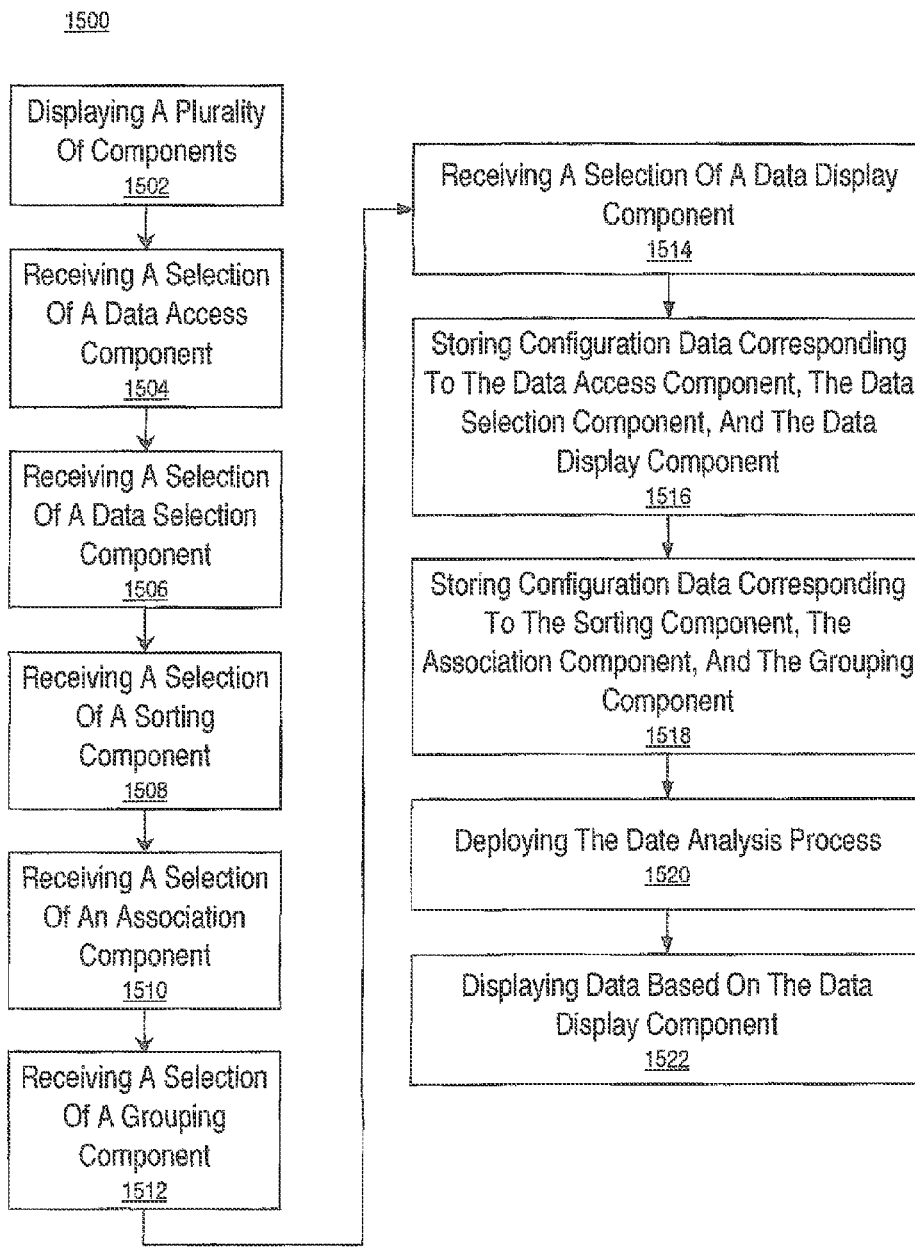
FIG. 15 shows an exemplary flowchart of processes for analytic process design, in accordance with embodiments of the present invention.

With reference to FIG. 15, exemplary flowchart 1500 illustrates example computer controlled processes used by various embodiments of the present invention. Although specific blocks are disclosed in flowchart 1500, such blocks are exemplary. That is, embodiments are well suited to performing various other blocks or variations of the blocks recited in flowchart 1500. It is appreciated that the blocks in flowchart 1500 may be performed in an order different than presented, and that not all of the blocks in flowchart 1500 may be performed. Flowchart 1500 includes processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

FIG. 15 shows an exemplary flowchart of processes for analytic process design. Process 1500 may be performed by a computer system executing an analytics design platform (e.g., analytics design platform 108). It is noted that some components may be optional in the design of some analytics processes.

At block 1502, a plurality of components is displayed within an electronic system. The plurality of components is operable to be used for designing a data analysis process.

At block 1504, a selection of a data access component of the plurality of components is received. In one embodiment, the data access component is operable for configuring access to a data source (e.g., reading line by line of a log file).

At block 1506, a selection of a data selection component of the plurality of components is received. In one embodiment, the data selection component (e.g., parser, filter, or smartfilter) is operable for selecting portions of data accessed via the data access component.

At block 1508, a selection of a sorting component of the plurality of components is received. In one embodiment, the sorting component is operable for configuring sorting data of the data source.

At block 1510, a selection of an association component of the plurality of components is received. In one embodiment, the association component is operable for configuring association of data of the data source.

At block 1512, a selection of a grouping component of the plurality of components is received. In one embodiment, the grouping component is operable for configuring of grouping data of the data source.

At block 1514, a selection of a data display component of the plurality of components is received. In one embodiment, the data display component is operable for configuring display of data of selected based on the data selection component (e.g., via graph or table).

At block 1516, configuration data corresponding to the data access component, the data selection component, and the data display component is stored.

At block 1518, configuration data corresponding to the sorting component, the association component, and the grouping component is stored.

At block 1520, the data analysis process is deployed. In one embodiment, the deploying comprises executing the configuration data.

At block 1522, data is displayed based on the data display component. In one embodiment, the displaying of data based on the display component comprises displaying a graph or a table.

Figure 16:
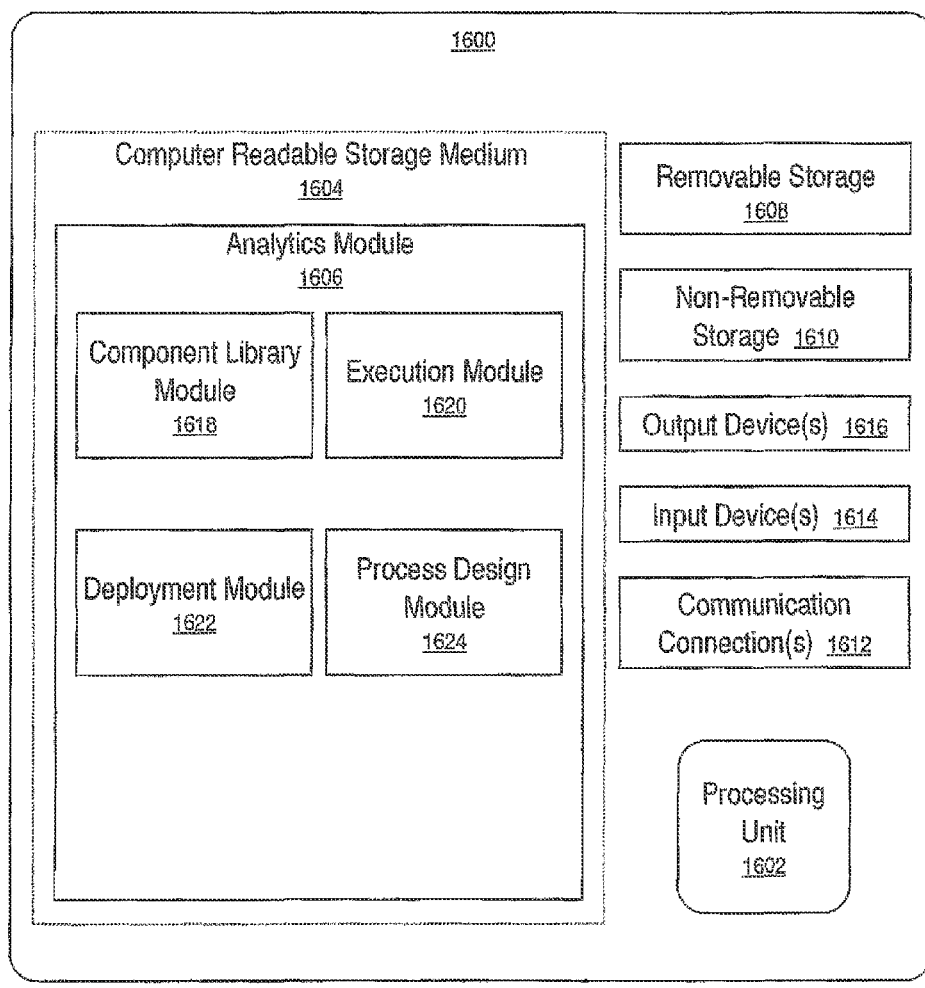
FIG. 16 shows a block diagram of exemplary computer system and corresponding modules, in accordance with one embodiment of the present invention.

FIG. 16 shows a block diagram of exemplary computer system environment and corresponding modules, in accordance with one embodiment of the present invention. With reference to FIG. 16, an exemplary system module for implementing embodiments includes a general purpose computing system environment, such as computing system environment 1600. Computing system environment 1600 may include, but is not limited to, servers, desktop computers, laptops, tablet PCs, mobile devices, and smartphones. In its most basic configuration, computing system environment 1600 typically includes at least one processing unit 1602 and computer readable storage medium 1604. Depending on the exact configuration and type of computing system environment, computer readable storage medium 1604 may be volatile (such as RAM), non-volatile (such as ROM, flash memory, etc.) or some combination of the two. Portions of computer readable storage medium 1604 when executed allow design of an analytics process (e.g., process 1500).

Additionally, computing system environment 1600 may also have additional features/functionality. For example, computing system environment 1600 may also include additional storage (removable and/or non-removable) including, but not limited to, magnetic or optical disks or tape. Such additional storage is illustrated in FIG. 16 by removable storage 1608 and non-removable storage 1610. Computer storage media includes volatile and nonvolatile, removable and non-removable media implemented in any method or technology for storage of information such as computer readable instructions, data structures, program modules or other data. Computer readable medium 1604, removable storage 1608 and nonremovable storage 1610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 1600. Any such computer storage media may be part of computing system environment 1600.

Computing system environment 1600 may also contain communications connection(s) 1612 that allow it to communicate with other devices. Communications connection(s) 1612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 1612 may allow computing system environment 1600 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 1612 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 1600 may also have input device(s) 1614 such as a keyboard, mouse, pen, voice input device, touch input device, remote control, etc. Output device(s) 1616 such as a display, speakers, etc. may also be included. All these devices are well known in the art and are not discussed at length.

In one embodiment, computer readable storage medium 1604 includes analytics module 1606 for analytic process development. Analytics module 1606 includes component library module 1618, execution module 1620, deployment module 1622, and process design module 1624.

Component library module 1618 comprises a plurality of components operable for configuring portions of an analysis process. Component library 1618 can include a filter component operable to filter data, a parser component operable to parse data, a data access component operable for configuring access to a data source, and a data selection component operable for configuring selection of data. Component library 1618 can further include a data display component operable for configuring display of data, a sorting component operable for configuring sorting of data, a component library comprises an association component operable for configuring association of data, and a grouping component operable for configuring grouping of data.

Process design module 1624 is operable for designing an analysis process via a graphical user interface (GUI). In one embodiment, the GUI is operable for selection of one or more components of the component library module 1618 and configuration of the one or more components.

Execution module 1620 is operable for executing the analytics processes based on the configuration of the one or more components. In one embodiment, execution module 1620 is operable to control multi-threaded execution of the analytics process.

Deployment module 1622 is operable for controlling the executing of the analysis process. In one embodiment, deployment module 1622 is operable to control execution of an analytics process on a plurality of servers. In another embodiment, deployment module 1622 is operable to control execution of an analytics process on a server of a peer-to-peer network.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method comprising:
providing a presentation of a user interface with a first component that represents a step in a data analysis process, a second component that represents another step in the data analysis process, and a connection that exists between the first component and the second component that represents a transfer of data between the step and the other step in the data analysis process;

determining, for each output in the connection that exists between the first component and the second component, whether a respective output variable type matches an input variable type for an input in the connection for the second component while providing the presentation of the user interface with the first component, the second component, and the connection that exists between the first component and the second component;

updating the presentation of the user interface with a warning upon determining, for at least one of the outputs of the first component in the connection between the first component and the second component, that the respective output variable type does not match an input variable type for an input in the connection for the second component;

receiving input indicating a selection of the connection that exits between the first component and the second component in the user interface;

updating a presentation of the user interface to include details about the connection in response to receiving the input indicating the selection of the connection; and receiving second input indicating a change of an output variable type for one of the outputs for the first component or a change of an input variable type for one of the inputs for the second component while providing the presentation of the user interface with the details about the connection.

2. The method of claim 1 wherein updating the presentation of the user interface with the warning comprises updating the presentation of the user interface with the warning that includes details about how, for at least one of the outputs of the first component in the connection between the first component and the second component, the respective output variable type does not match an input variable type for an input in the connection for the second component.

3. The method of claim 1 wherein updating the presentation of the user interface with the warning comprises updating the details about the connection to identify with another warning a particular channel in the connection that includes only an input for the first component or only an output for the second component.

4. The method of claim 3 wherein the other warning comprises an input validation error.

5. The method of claim 3 wherein the other warning comprises an output validation error.

6. The method of claim 3 wherein the other warning comprises a variable type validation error.

7. The method of claim 1 wherein updating the presentation of the user interface to include details about the connection comprises updating the presentation to include a one-to-one mapping of outputs for the first component to inputs for the second component.

8. The method of claim 1 comprising:
receiving input indicating that the connection between the first component and the second component should be created; and
creating the connection between the first component and the second component in the presentation, wherein determining, for each output in the connection that exists between the first component and the second component, whether the respective output variable type matches an input variable type for an input for the second component occurs concurrently in real time with creating the connection between the first component and the second component in the presentation.

9. The method of claim 1 wherein each of the first component and the second component have a predesigned functionality for the data analysis process.

10. A system, comprising:
a data processing apparatus; and
a non-transitory computer readable storage medium in data communication with the data processing apparatus and storing instructions executable by the data processing apparatus and upon such execution cause the data processing to perform operations comprising:
providing a presentation of a user interface with a first component that represents a step in a data analysis process, a second component that represents another step in the data analysis process, and a connection that exists between the first component and the second component that represents a transfer of data between the step and the other step in the data analysis process;
determining, for each output in the connection that exists between the first component and the second component, whether a respective output variable type matches an input variable type for an input in the connection for the second component while providing the presentation of the user interface with the first component, the second component, and the connection that exists between the first component and the second component;
updating the presentation of the user interface with a warning upon determining, for at least one of the outputs of the first component in the connection between the first component and the second component, that the respective output variable type does not match an input variable type for an input in the connection for the second component;
receiving input indicating a selection of the connection that exits between the first component and the second component in the user interface;
updating a presentation of the user interface to include details about the connection in response to receiving the input indicating the selection of the connection; and
receiving other input indicating a change of an output variable type for one of the outputs for the first component or a change of an input variable type for one of the inputs for the second component while providing the presentation of the user interface with the details about the connection.

11. The system of claim 10 wherein updating the presentation of the user interface with the warning comprises updating the presentation of the user interface with the warning that includes details about how, for at least one of the outputs of the first component in the connection between the first component and the second component, the respective output variable type does not match an input variable type for an input in the connection for the second component.

12. The system of claim 10 wherein updating the presentation of the user interface with the warning comprises updating the details about the connection to identify with another warning a particular channel in the connection that includes only an input for the first component or only an output for the second component.

13. The system of claim 12 wherein the other warning comprises an input validation error.

14. The system of claim 12 wherein the other warning comprises an output validation error.

15. The system of claim 12 wherein the other warning comprises a variable type validation error.

16. The system of claim 10 wherein updating the presentation of the user interface to include details about the connection comprises updating the presentation to include a one-to-one mapping of outputs for the first component to inputs for the second component.

17. The system of claim 10 the operations comprising:
receiving input indicating that the connection between the first component and the second component should be created; and
creating the connection between the first component and the second component in the presentation, wherein determining, for each output in the connection that exists between the first component and the second component, whether the respective output variable type matches an input variable type for an input for the second component occurs concurrently in real time with creating the connection between the first component and the second component in the presentation.

18. The system of claim 10 wherein each of the first component and the second component have a predesigned functionality for the data analysis process.

19. A non-transitory computer readable storage medium storing instructions executable by a data processing apparatus and upon such execution cause the data processing to perform operations comprising:
providing a presentation of a user interface with a first component that represents a step in a data analysis process, a second component that represents another step in the data analysis process, and a connection that exists between the first component and the second component that represents a transfer of data between the step and the other step in the data analysis process;
determining, for each output in the connection that exists between the first component and the second component, whether a respective output variable type matches an input variable type for an input in the connection for the second component while providing the presentation of the user interface with the first component, the second component, and the connection that exists between the first component and the second component;
updating the presentation of the user interface with a warning upon determining, for at least one of the outputs of the first component in the connection between the first component and the second component, that the respective output variable type does not match an input variable type for an input in the connection for the second component;
receiving input indicating a selection of the connection that exits between the first component and the second component in the user interface;
updating a presentation of the user interface to include details about the connection in response to receiving the input indicating the selection of the connection; and
receiving other input indicating a change of an output variable type for one of the outputs for the first component or a change of an input variable type for one of the inputs for the second component while providing the presentation of the user interface with the details about the connection.

20. The computer readable storage medium of claim 19 wherein updating the presentation of the user interface with the warning comprises updating the presentation of the user interface with the warning that includes details about how, for at least one of the outputs of the first component in the connection between the first component and the second component, the respective output variable type does not match an input variable type for an input in the connection for the second component.

21. The computer readable storage medium of claim 19 wherein updating the presentation of the user interface with the warning comprises updating the details about the connection to identify with another warning a particular channel in the connection that includes only an input for the first component or only an output for the second component.

22. The computer readable storage medium of claim 21 wherein the other warning comprises an input validation error.

23. The computer readable storage medium of claim 21 wherein the other warning comprises an output validation error.

24. The computer readable storage medium of claim 21 wherein the other warning comprises a variable type validation error.

25. The computer readable storage medium of claim 19 wherein updating the presentation of the user interface to include details about the connection comprises updating the presentation to include a one-to-one mapping of outputs for the first component to inputs for the second component.

26. The computer readable storage medium of claim 19 comprising:
receiving input indicating that the connection between the first component and the second component should be created; and
creating the connection between the first component and the second component in the presentation, wherein determining, for each output in the connection that exists between the first component and the second component, whether the respective output variable type matches an input variable type for an input for the second component occurs concurrently in real time with creating the connection between the first component and the second component in the presentation.

27. The computer readable storage medium of claim 19 wherein each of the first component and the second component have a predesigned functionality for the data analysis process.

* * * * *